What

United States Patent [19]
Kaihotsu et al.

[11] Patent Number: 5,898,510
[45] Date of Patent: *Apr. 27, 1999

[54] IMAGE FORMING APPARATUS AND LIGHT SOURCE UNIT

[75] Inventors: Takahiro Kaihotsu, Fujisawa; Akihiko Yushiya, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,926

[22] Filed: Feb. 22, 1996

[30] Foreign Application Priority Data

Feb. 24, 1995  [JP]  Japan  ..................................... 7-036941
Apr. 18, 1995  [JP]  Japan  ..................................... 7-092538

[51] Int. Cl.$^6$ ..................................................... H04N 1/46
[52] U.S. Cl. .......................... 358/509; 358/513; 358/505
[58] Field of Search ..................................... 358/509, 513, 358/514, 475, 505, 487, 296; 362/800; 250/578.1, 208.1; 355/37, 67, 70, 53, 71; 348/370; 395/109, 105, 107, 106, 112, 117; 347/238, 232, 115

[56] References Cited

U.S. PATENT DOCUMENTS

| | | | |
|---|---|---|---|
| 4,812,900 | 3/1989 | Kadowaki et al. | 358/509 |
| 4,926,253 | 5/1990 | Nakashima et al. | 358/509 |
| 4,930,008 | 5/1990 | Suzuki et al. | 358/509 |
| 5,712,674 | 1/1998 | Doi | 347/238 |

*Primary Examiner*—Edward L. Coles
*Assistant Examiner*—Fan Lee
*Attorney, Agent, or Firm*—Fitzpatrick, Cella, Harper & Scinto

[57] ABSTRACT

An image forming apparatus includes a light emitting unit having a plurality of light emitting elements each having a different spectral characteristic, a light source having a plurality of light emitting means disposed on a substrate, and a photoelectric conversion unit for converting light from an object applied with light from the light source into an image signal, wherein the light emitting unit has at least two light emitting elements having a peak wavelength difference less than 30 nm.

59 Claims, 16 Drawing Sheets

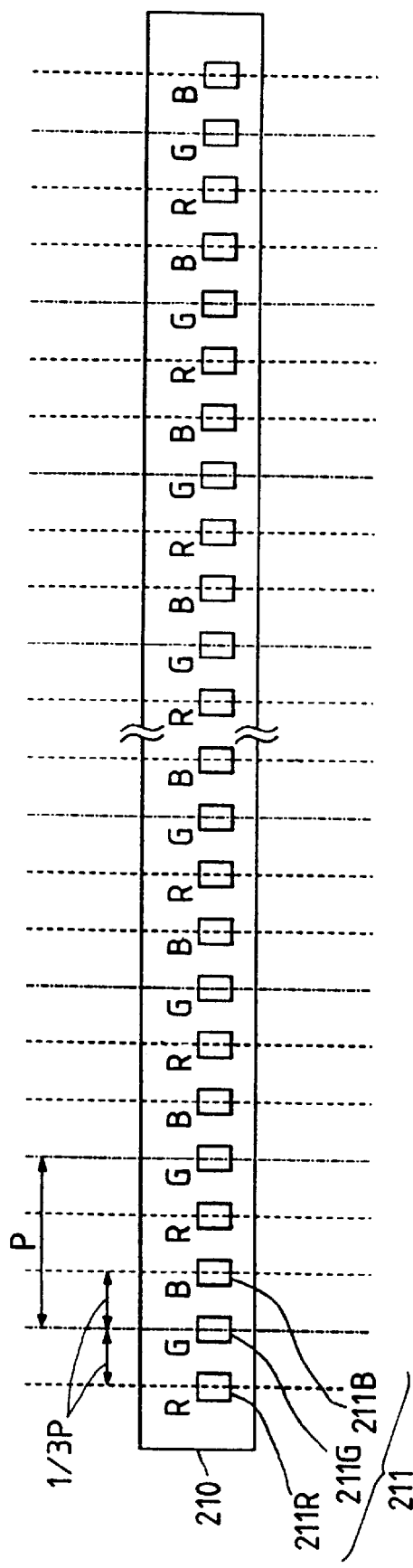
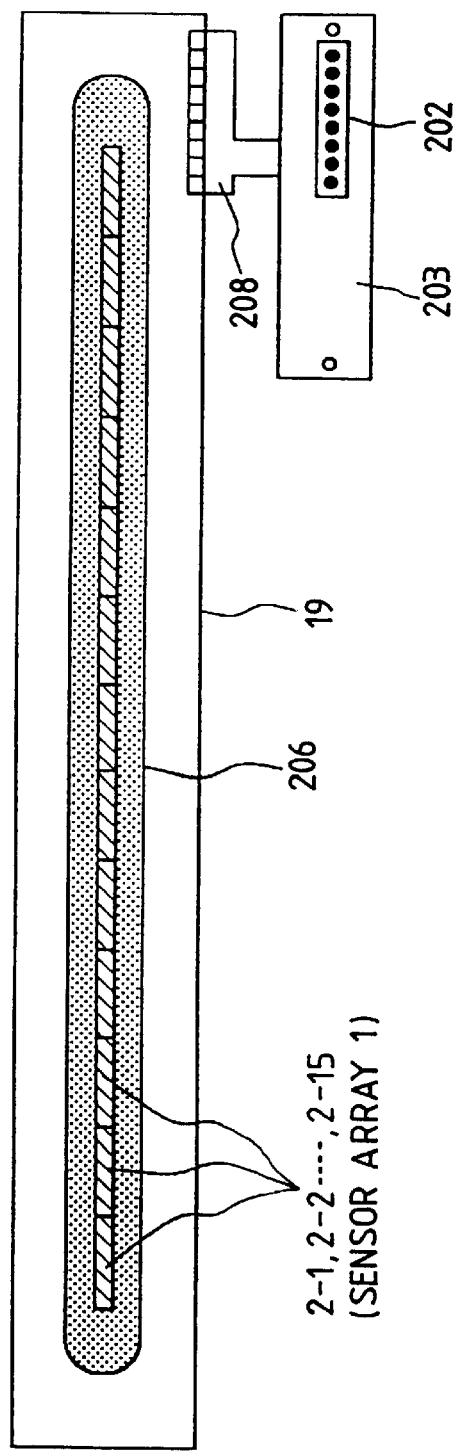

IMAGE FORMING APPARATUS AND LIGHT SOURCE UNIT

BACKGROUND OF THE INVENTION

1. Field of the Invention

The present invention relates to an image forming apparatus for forming an image and outputting an image signal, and a light source unit used with the image forming apparatus.

2. Related Background Art

As one of conventional image forming apparatus, a light source switching type color image sensor is known which reads a color image by applying light beams having three different spectral characteristics to the same color image and outputting image signals. FIGS. 1 to 4 show an example of such an image forming apparatus. This image forming apparatus is constituted by LEDs of red, green, and blue (hereinafter abbreviated as R, G, and B) colors, a short focal point focussing element array, and a sensor array with a plurality of line sensors being disposed in line.

FIG. 1 is a perspective view showing the image forming apparatus, and FIG. 2 is a cross sectional view of the image forming apparatus. Referring to FIGS. 1 and 2, in the fundamental structure of the image forming apparatus, a light beam 212 outputted from an LED array 211 on an LED substrate 210 mounted on a frame 200 is applied to an original which is in contact with a transparent glass plate 201 mounted on the upper area of the frame 200, and a light beam 213 reflected from the original is applied via an optical system 209 to a sensor array 1 on a sensor substrate 19.

As shown in FIG. 3, the LED array 211 has a plurality set of LED chips 211R, 211G, and 211B alternately disposed in line on the LED substrate 210. The LED chips 211R, 211G, and 211B emit RGB light beams, and light of each color of RGB can be independently turned on and off. The optical system uses a short focal point focussing element array, for example, a product name "Selfoc Lens Array" manufactured by Nippon Sheet Glass Co., Ltd.

As shown in FIG. 4, the sensor array 1 has a plurality of line sensors 2-1, 2-2, . . . , 2-15 disposed in line on the sensor substrate 19, the line sensors being covered with a protection film 206. A tight contact type multi-chip image sensor fundamentally reads an image by applying a light beam reflected from an original to a sensor array and focussing an image of the same size as an original. Therefore, the length of the sensor array 1 is required to be equal to or longer than the width of an original.

The length of the sensor array 1 changes with the size of an original to be read, and the number of line sensors of the sensor array 1 changes. For example, for reading of an A3 size original, the sensor array has fifteen line sensors assuming that the length of each line sensor is 20 mm.

The sensor substrate 19 is coupled via a flexible substrate 208 to another substrate 203 on which a connector 202 for input/output of a power source and control signals is mounted. The substrate 203 is fixedly mounted on the frame 200 by means of screws 207.

Next, the read operation of the image forming apparatus will be described. First, data for correcting shading error is read, the shading error being generated by a variation of line sensor sensitivities and a variation of emission of a light source. In reading shading correction data, LED chips 211R, 211G, and 211B are sequentially turned on to read a white reference plate built in the image forming apparatus, and the output signals of the image sensor are temporarily stored in memories provided for respective colors.

By reading the sensor output signals r1 for LED 211R, g1 for LED 211G, and b1 for LED 211G obtained by independent emission of RGB light sources and stored in the memories, the gain of each color is adjusted to satisfy the condition of r=g=b where r, g and b are sensor output signals for RGB colors obtained when the white reference plate is again read.

In reading an original with a light source switching color image sensor, it is necessary to independently apply RGB light beams to the original in order to obtain three RGB signals. To this end, a frame sequential method and a line sequential method are used. With the frame sequential method, LEDs of one color among RGB colors are turned on to sub-scan the whole frame of the original, this operation being repeated for the other two colors. With the line sequential method, LEDs of three colors are sequentially turned on for each line of an original to sub-scan the whole frame. Both the methods can obtain RGB signals of the whole area of an original to reproduce a color image.

The ideal spectral characteristics of RGB light sources for a light source switching color image sensor will next be described. A G light source is used by way of example. As shown in FIG. 5, it is assumed that an original image is read by using three G light sources each having a different spectral characteristic. A light source G6 does not contain light in the wavelength ranges from near 480 to near 500 nm and from near 570 to near 590 nm, as compared to the light source G7.

Therefore, if colors a and b shown in FIG. 6 having different spectral characteristics only in the wavelength range near 500 nm are read by using the light source G6, a difference of the spectral characteristics between the colors a and b cannot be discriminated and generally a same G signal is obtained for the colors a and b.

If the B light source having a shorter wavelength than the G light source does not contain light in the same wavelength range as the light source G6, then the colors a and b cannot be discriminated. In order to improve color discrimination between various colors contained in a color original, the spectral characteristics of the RGB light sources are required to cover the whole visible light range.

Next, a difference of color reproduction between the light sources G7 and G8 will be described. Light of the light sources G7 and G8 covers the same wavelength range, and only the energy distribution in the wavelength range is different. Color spaces of a light source switching color image sensor using the light sources G7 and G8 are shown in FIG. 7.

The diagram shown in FIG. 7 is called a CIE-xy chromaticity diagram. In FIG. 7, all colors are contained in an area surrounded by a solid curve line representative of a spectrum locus or reddish-purple line. Triangles in this area represent color spaces of the color image sensor. An output $G_{OUT}$ of an image sensor when an original is applied with light from the light source G7 or G8 is given by the following equation.

$$G_{OUT} = \int G7(\lambda)(\text{or } G8(\lambda))S(\lambda)d\lambda$$

where $G7(\lambda)$ represents a spectral emission characteristic of LED G7, $G8(\lambda)$ represents a spectral emission characteristic of LED G8, and $S(\lambda)$ represents a spectral sensitivity characteristic of a line sensor.

Color reproduction is made not by measuring the detailed spectral reflection characteristic of an original, but by using RGB signals. As seen from FIG. 7, the color image sensor using the light source G7 has a broader color space than the light source G8. The spectral characteristic of the light source G7 for a light source switching color image sensor is more desirable than the light source G8.

The ideal spectral characteristics of RGB light sources for a light source switching color image sensor are therefore required to have as broad color spaces as possible and cover the whole wavelength range. An LED light source has many advantages such as compact size, high response speed, and good reliability, over other tubular type light sources. Therefore, it is suitable for use with a light source switching color image sensor.

Color reproduction using RGB signals of an LED light source switching color image sensor is, however, associated with some problems. FIG. 8 shows an example of a color space of a conventional LED light source switching color image sensor. As seen from FIG. 8, the color space of the image sensor is rather narrow as compared to various colors in a natural world. This results from that the spectral characteristic of an LED of G color is positioned too near the long wavelength side and that there is a wavelength range having too small light emission. There are LEDs for three colors having the spectral characteristics which can solve the above problems and realize ideal color reproduction. However, such LEDs are very expensive and the manufacturing cost of an image forming apparatus becomes too high. In contrast, general LEDs used for display devices or other devices are mass-produced and relatively cheap. If such display LEDs are used as light sources of an image sensor, the cost can be reduced considerably.

However, the display LED has a sharp spectral characteristic with a small full width at half-maximum. It is necessary for a light source of a light source switching color image sensor to cover the whole visible light range by using LEDs of three RGB colors. Therefore, if display LEDs are used as the light sources for an image sensor, they are associated with the above problems such as a wavelength range with an extremely small emission amount and poor color reproduction, because the display LEDs have too narrow full width at half-maximum.

In a conventional image forming apparatus, LED chips of three RGB colors are disposed at an equal pitch. Therefore, as shown in FIG. 9, an incident angle of light from an LED for each color is different for each color at an arbitrary point on an original. As a result, the optical information of an original supplied to a sensor pixel train, i.e., the intensity of vertical components of a reflected light beam, is different at each point on the original. From these reasons, even if an original having a uniform density is read, the color component ratio is different at each point of the original to thereby result in color shade. As shown in FIG. 10, the size of shadow at the corner of a convex portion of an uneven original such as an original with a pasted sheet changes with the color component, coloring the shadow at the corner.

SUMMARY OF THE INVENTION

It is an object of the present invention to provide an image forming apparatus capable of forming an image with high fidelity and with low cost.

It is another object of the present invention to provide a low cost light source unit usable with an image forming apparatus and capable of forming an image with high fidelity.

According to an embodiment of the invention achieving the above objects, an image forming apparatus comprises: light emitting means having a plurality of light emitting elements each having a different spectral characteristic; a light source having a plurality of light emitting means disposed on a substrate; and photoelectric converting means for converting light from an object applied with light from the light source into an image signal, wherein the light emitting means has at least two light emitting elements having a peak wavelength difference less than 30 nm.

According to another embodiment of the invention, a light source unit usable with an image forming apparatus having photoelectric converting means for converting light from an object into an image signal, comprises: light emitting means mounted facing the photoelectric converting means and having a plurality of light emitting elements each having a different spectral characteristic; and a light source having a plurality of light emitting means disposed on a substrate, wherein the light emitting means has at least two light emitting elements having a peak wavelength difference less than 30 nm.

With these configurations, it becomes possible to provide an image forming apparatus capable of an image with high fidelity and low cost and a light source unit usable with the image forming apparatus.

According to another embodiment of the invention, an image forming apparatus comprises: light emitting means having a plurality of light emitting elements each having a different spectral characteristic; a light source having a plurality of light emitting means disposed on a substrate; and photoelectric converting means mounted facing the light emitting means for converting light from an object applied with light from the light source into an image signal, wherein a distance between light emitting elements is smaller than a distance between light emitting means.

According to still another embodiment of the invention, a light source unit usable with an image forming apparatus having photoelectric converting means for converting light from an object into an image signal, comprises: light emitting means mounted facing the photoelectric converting means and having a plurality of light emitting elements each having a different spectral characteristic; and a light source having a plurality of light emitting means disposed on a substrate, wherein a distance between light emitting elements is smaller than a distance between light emitting means.

With these configurations, the emission centers of light emitting elements constituting the light emitting means for the photoelectric converting means are generally at the same position. Therefore, the incident angle of a light beam from each light emitting element is generally the same for each color at an arbitrary point on an original, and the color components ratio, in the vertical direction, of light reflected from the original does not change with the position on the object. Furthermore, even if an uneven original is read, the size of shadow generated at the corner of a convex area is generally the same for each spectral characteristic, so that the image quality can be improved. Still further, even if the number of light emitting elements is reduced, the image quality will not be degraded. Therefore, an inexpensive and high quality image forming apparatus and a light source unit usable with the image forming apparatus can be realized.

The other objects and advantages of the present invention will become more apparent from the detailed description of embodiments when read in connection with the accompanying drawings.

BRIEF DESCRIPTION OF THE DRAWINGS

FIG. 3 shows the structure of a conventional light source.

FIG. 4 shows the structure of a sensor substrate of the multi-chip color image sensor.

DETAILED DESCRIPTION OF THE PREFERRED EMBODIMENTS

Embodiments of the invention will be described with reference to the accompanying drawings.

Figure 1:
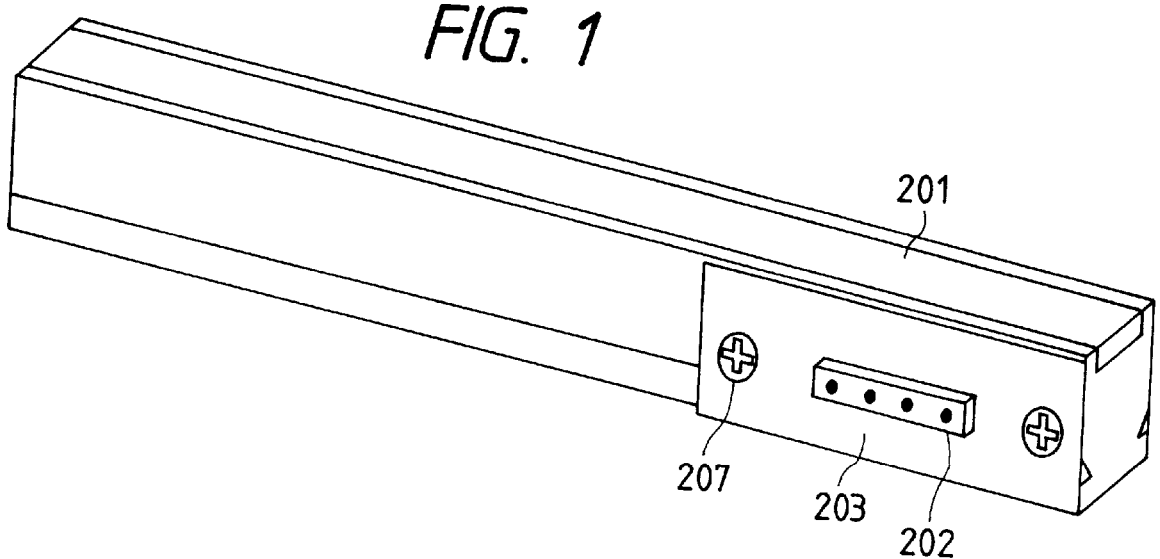
FIG. 1 is a perspective view of a multi-chip color image sensor.
Figure 2:
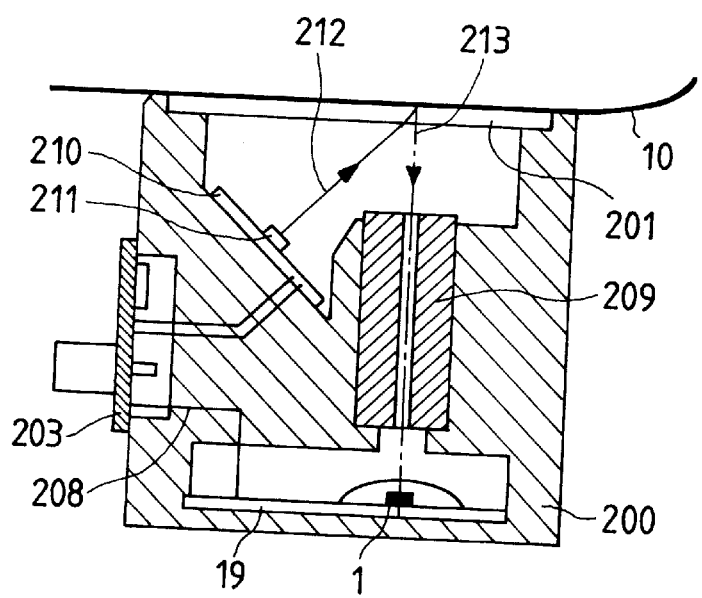
FIG. 2 is a cross sectional view of the multi-chip color image sensor.
Figure 5:
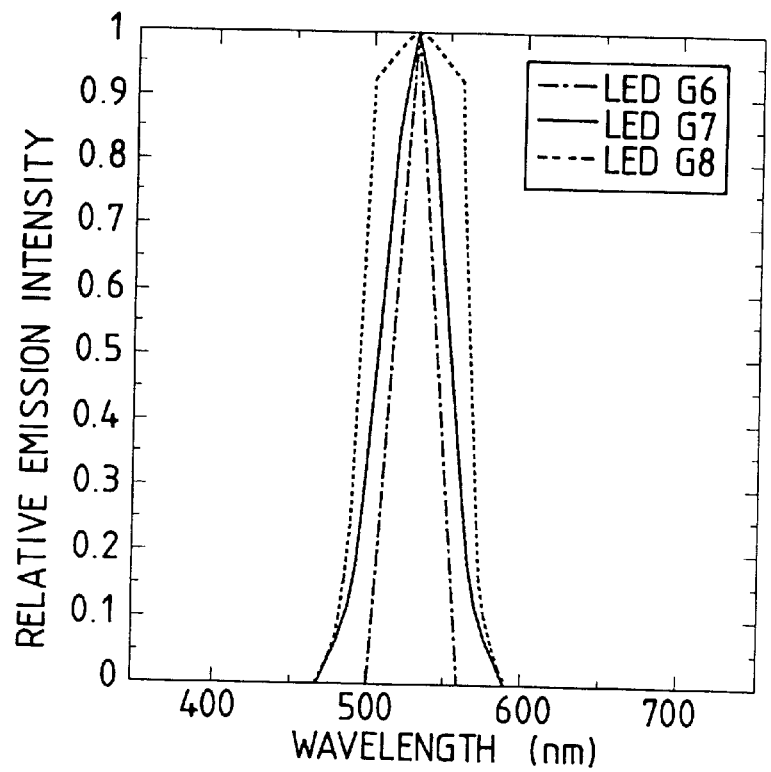
FIG. 5 is a diagram showing spectral emission characteristics of G light sources.
Figure 6:
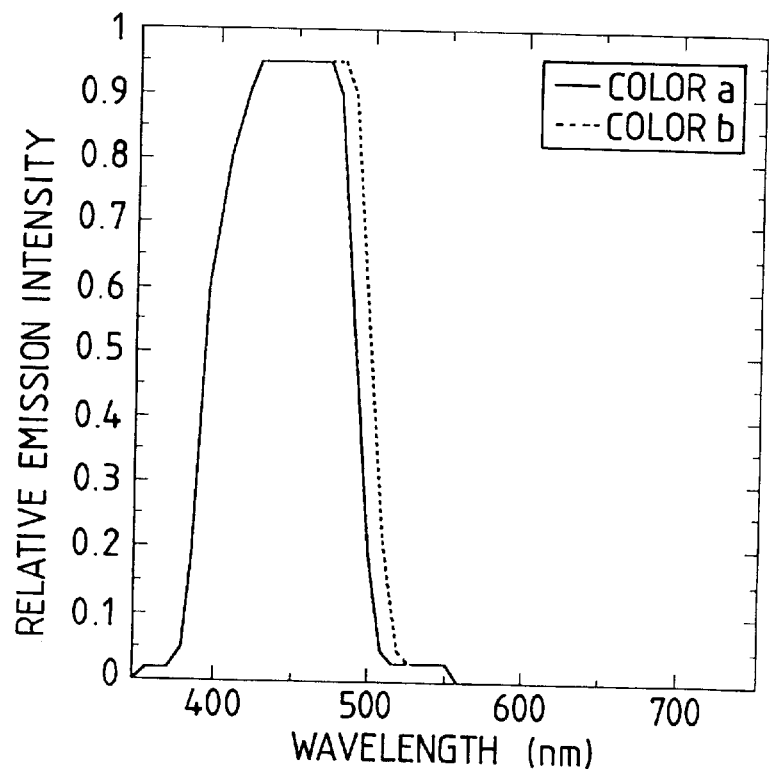
FIG. 6 is a diagram showing spectral reflection characteristics of two colors.
Figure 7:
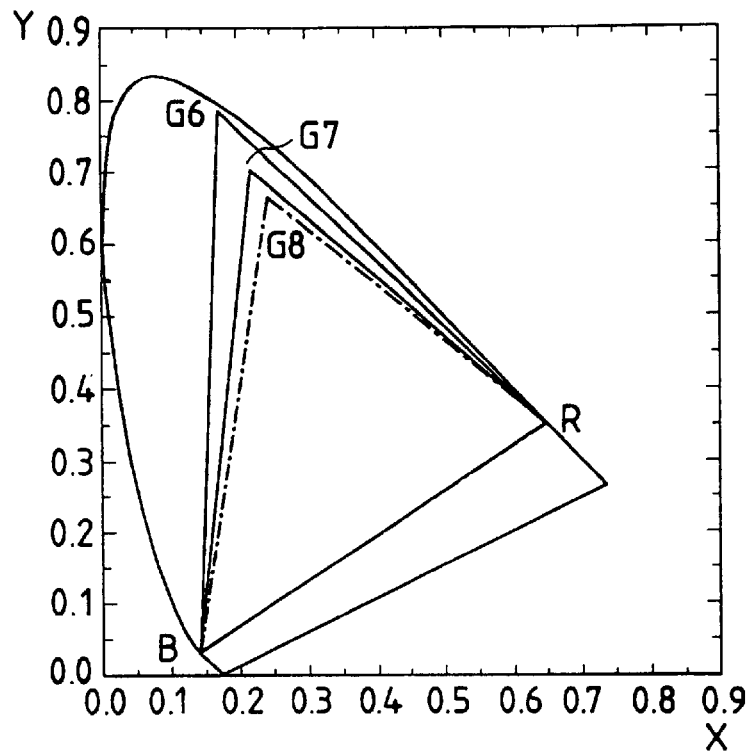
FIG. 7 is a diagram showing color spaces of a color image sensor using three G light sources.
Figure 11:
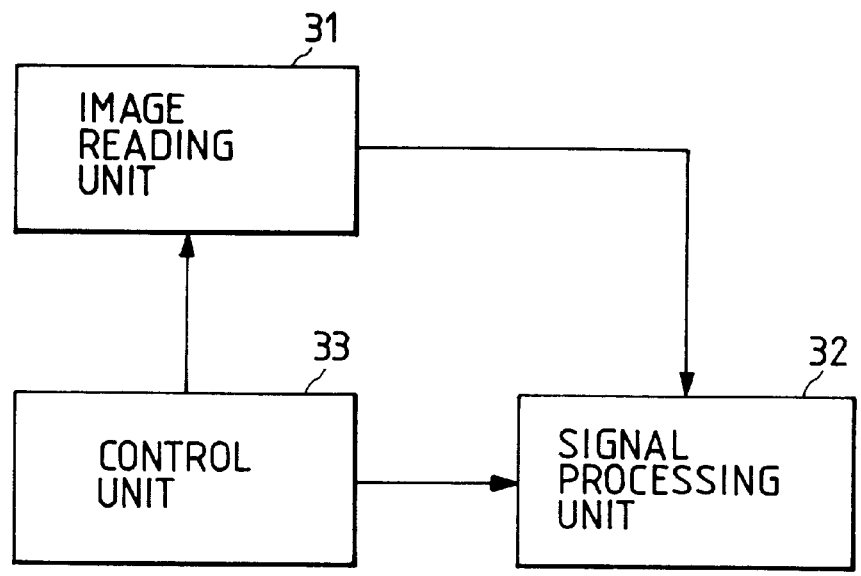
FIG. 11 is a block diagram showing the structure of an image forming apparatus according to an embodiment of the invention.
Figure 12:
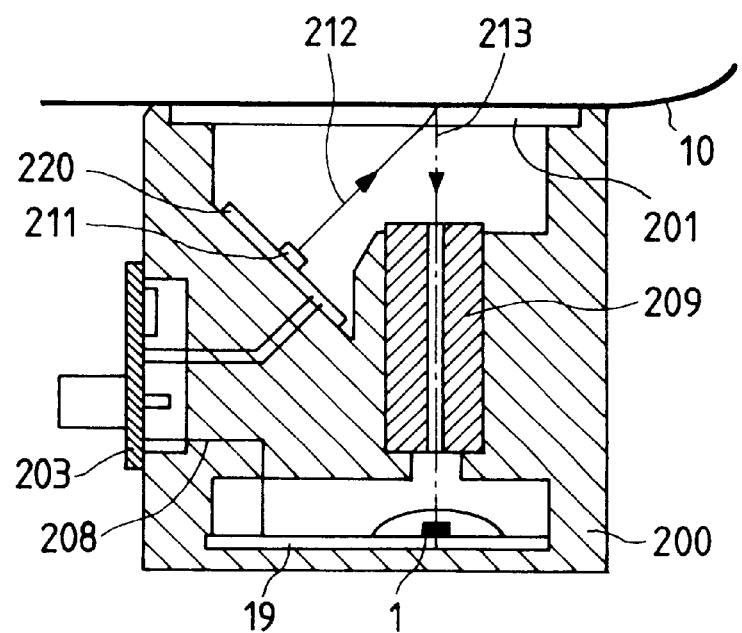
FIG. 12 is a cross sectional view of a multi-chip color image sensor according to an embodiment of the invention.

FIG. 11 is a block diagram showing the structure of an image forming apparatus according to a first embodiment of the invention. Referring to FIG. 11, an image reading unit 31 reads an original image, and the read image signal is processed by a signal processing unit 32. A control unit 33 as a control means controls the whole operation of the image forming apparatus. FIG. 12 is a cross sectional view of a light source switching multi-chip color image sensor of this embodiment. Referring to FIG. 12, the fundamental structure is the same as the conventional image forming apparatus shown in FIG. 2. In FIG. 12, like elements to those shown in FIG. 2 are represented by using identical reference numerals, and the description thereof is omitted. In FIG. 12, reference numeral 1 represents a sensor array as a photoelectric conversion means, and reference numeral 220 represents an LED substrate to be later described.

Figure 13:
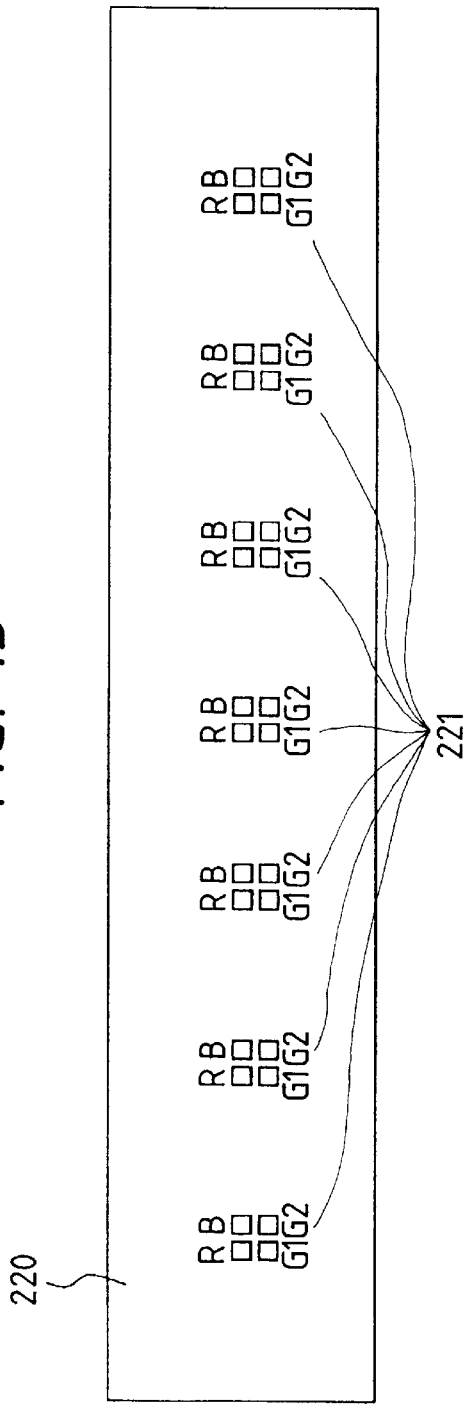
FIG. 13 shows the structure of an LED substrate of a first embodiment.

FIG. 13 shows the structure of the LED substrate 220 as a light source unit used with the light source switching multi-chip color image sensor according to the first embodiment of the invention. A set of LED chips 221R, 221G1, 221G2, and 221B having four different spectral characteristics R, G1, G2 and B constitutes an emission means. A plurality set of LED chips are disposed in line on the LED substrate 220, to thereby constitute an LED array 221. The fundamentals of this image forming apparatus are the same as the conventional image forming apparatus, except that two types of LED chips G1 and G2 are used for emitting light of G color. In this embodiment, the LED substrate 220 is assembled on the image sensor shown in FIG. 2, instead of the LED substrate 210.

Figure 14:
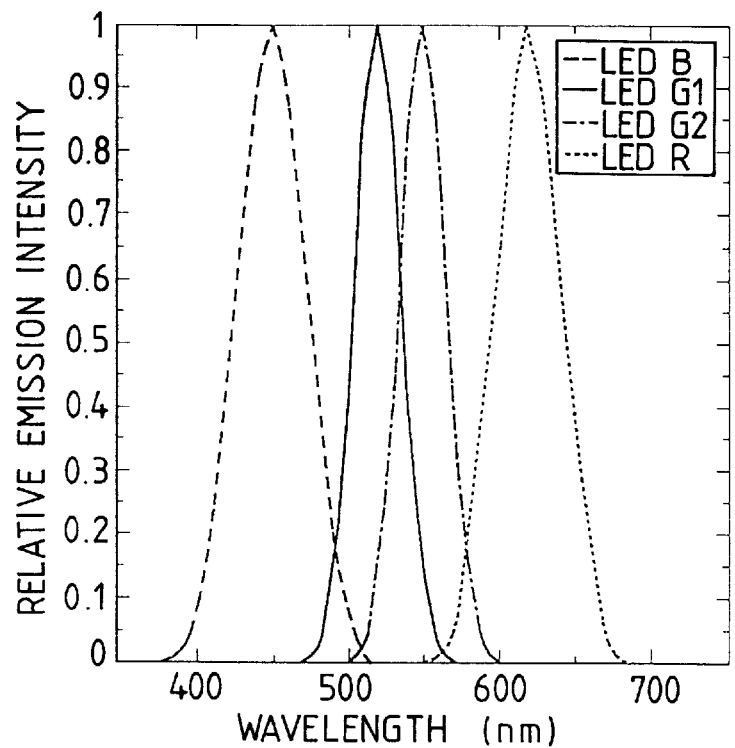
FIG. 14 is a diagram showing the spectral emission characteristic of LEDs of the first embodiment.

The spectral characteristics of the LED chips 221R, 221G1, 221G2, and 221B constituting the LED array 221 are shown in FIG. 14. The spectral characteristic of the LED chip 221G2 is the same as that of a conventional LED chip 211G, and the spectral characteristics of the LED chips 221R and 221B are the same as those of the conventional LED chips 211R and 211B. The new LED chip 221G1 added in this embodiment has the spectral characteristic of the LED chip 221G2 shifted toward the short wavelength side by 30 nm or smaller.

The relationship between the spectral characteristic and the material of an emission layer of an LED will be described. Research and development of high brightness LEDs of B and G colors have recently progressed rapidly. LEDs ten to one hundred times brighter than conventional LEDs are now available. In order to manufacture LEDs of high brightness, use of semiconductor crystal as a light emission material having a direct transition type energy band structure has an advantage over other materials from the viewpoint of an energy conversion efficiency. The relationship between the bandgap Eg of such direct transition type material and an emission wavelength is given by the following equation.

$$\lambda [nm] = 1.24*10/Eg\,[eV]$$

Figure 15:
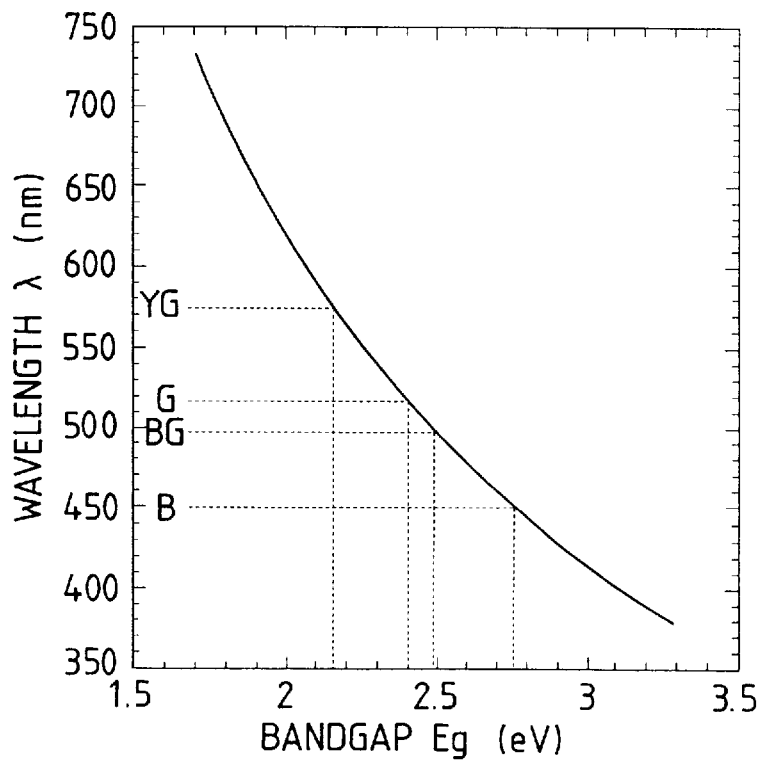
FIG. 15 is a diagram illustrating the relationship between an emission wavelength and a bandgap energy of semiconductor crystal used as the emission layer material of an LED.

This relationship between the bandgap Eg and the emission wavelength λ is shown in the graph of FIG. 15. The bandgaps Eg necessary for the light emission of four colors including blue (B), bluish green (BG), green (G), and yellowish green (YG) are shown in the graph of FIG. 15. Materials having such bandgaps are GaN (3.4 eV), ZnSe (2.6 eV), GaP (2.26 eV), and other materials. It has been reported that mixed crystal of GaN with InV (2.0 eV) or AlN (6.3 eV) has a bandgap in the range from 2.0 to 6.3 eV and can emit light of various wavelengths. The full width at half-maximum of the spectral distribution of an LED depends on a purity of material of a light emission layer.

As described earlier, the spectral characteristics of display LEDs of RGB colors are generally sharp having a small full width at half-maximum, because it is important for the spectral characteristics to provide a broad color space. In addition to a broad color space, RGB light sources of a light source switching color image sensor used for illuminating an original are required to cover the whole visible light range.

In this embodiment, low cost display LEDs having sharp spectral characteristics are used in combination so that RGB light sources can cover the whole visible light range. A conventional light source switching color image sensor has an insufficient light amount in the G color range. In view of this, LED 221G1 having the spectral characteristic with generally the same full width at half-maximum as LED 221G2 and having the emission wavelength range shifted toward the short wavelength side by 30 nm, is mounted on the LED substrate 220. LEDs 221G1 and 221G2 are turned on at the same time to obtain a G signal from the image sensor.

Figure 16:
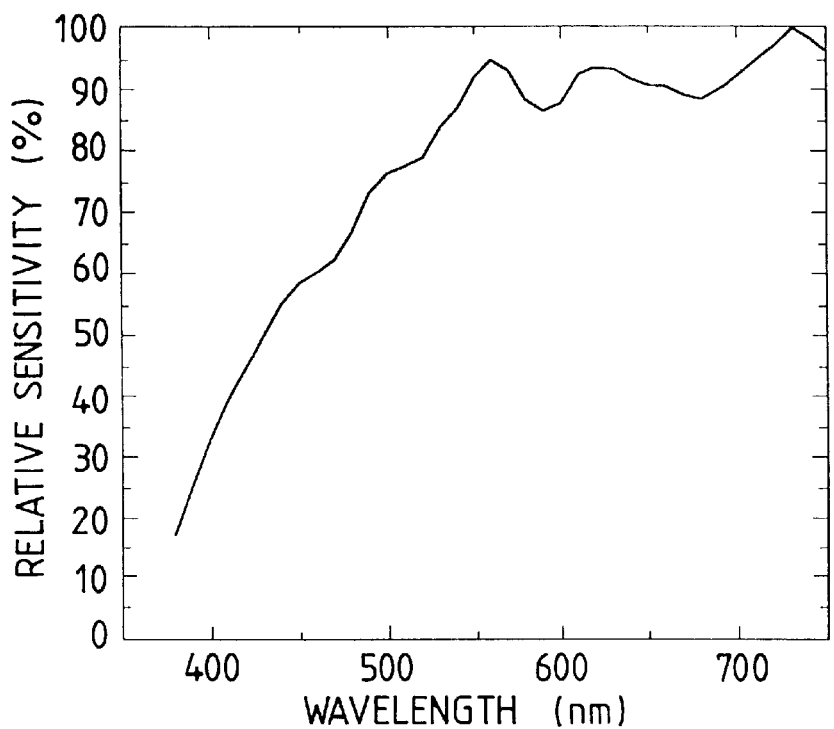
FIG. 16 is a diagram showing the spectral sensitivity characteristic of a line sensor.

The color space of such a color image sensor can be calculated in the following procedure. The xy coordinates of RGB three colors which determine the color space are calculated, first by calculating the tristimulus values of, for example, G color, i.e., Xg, Yg, Zg by the following equations.

$$Xg = K \int (G1(\lambda)+G2(\lambda))S(\lambda)x(\lambda)d\lambda$$

$$Yg = K \int (G1(\lambda)+G2(\lambda))S(\lambda)y(\lambda)d\lambda$$

$$Zg = K \int (G1(\lambda)+G2(\lambda))S(\lambda)z(\lambda)d\lambda$$

$$K = 100/\int D65(\lambda)y(\lambda)d\lambda$$

where $G1(\lambda)$: a spectral emission characteristic of LED chip G1, $G2(\lambda)$: a spectral emission characteristic of LED chip G2, $S(\lambda)$: a spectral sensitivity of a line sensor, $D65(\lambda)$: a spectral emission characteristic of a standard D65 light source, and $x, y, z(\lambda)$: a color matching function of CIE 1931 standard calorimetric system The spectral characteristic $S(\lambda)$ of the line sensor are shown in FIG. 16. The R tristimulus values Xr, Yr, and Zr and B tristimulus values Xb, Yb, and Zb can be calculated by replacing the terms of the spectral emission characteristics of the above equations with those of R and B LEDs.

From the tristimulus values Xg, Yg, and Zg, the CIE-xy coordinates of R color can be given by:

$$xg = Xg/(Xg+Yg+Zg)$$

$$yg = Yg/(Xg+Yg+Zg)$$

Similarly, the xy coordinates (xr, yr) of R color and the xy coordinates (xb, yb) of B color can be calculated in the above manner.

Figure 17:
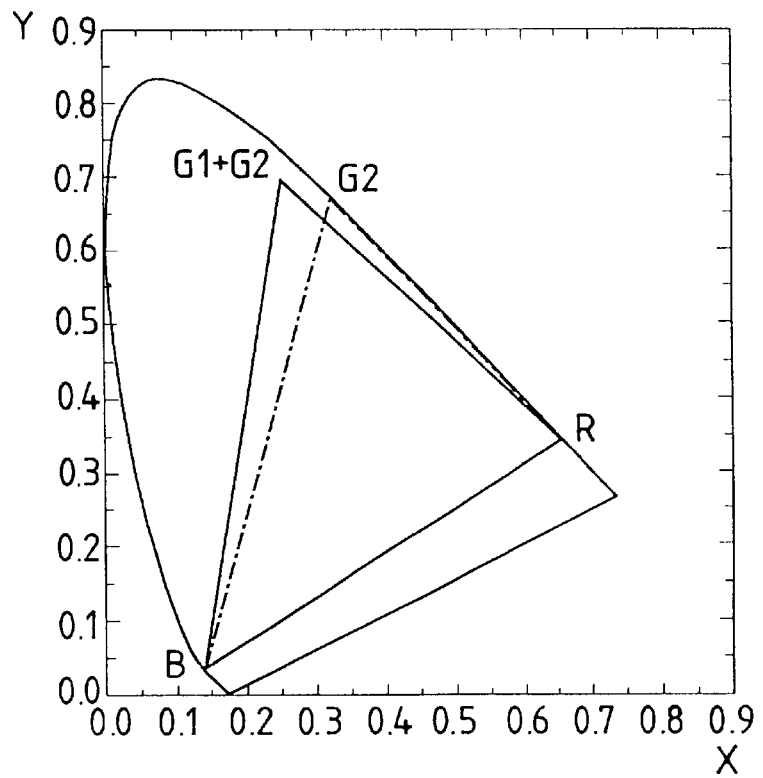
FIG. 17 is a diagram showing a color space of the multi-chip color image sensor of the first embodiment.

In accordance with the calculated RGB chromatic coordinates, the color space of the image sensor of this embodiment, i.e., the space in which colors capable of being reproduced by the image sensor are contained, is shown in FIG. 17. A triangle indicated by one-dot chain line corresponds to the conventional color space shown in FIG. 8. The color reproduction area of the image sensor is broader than the conventional image forming apparatus and the area has a balanced shape.

Figure 18:
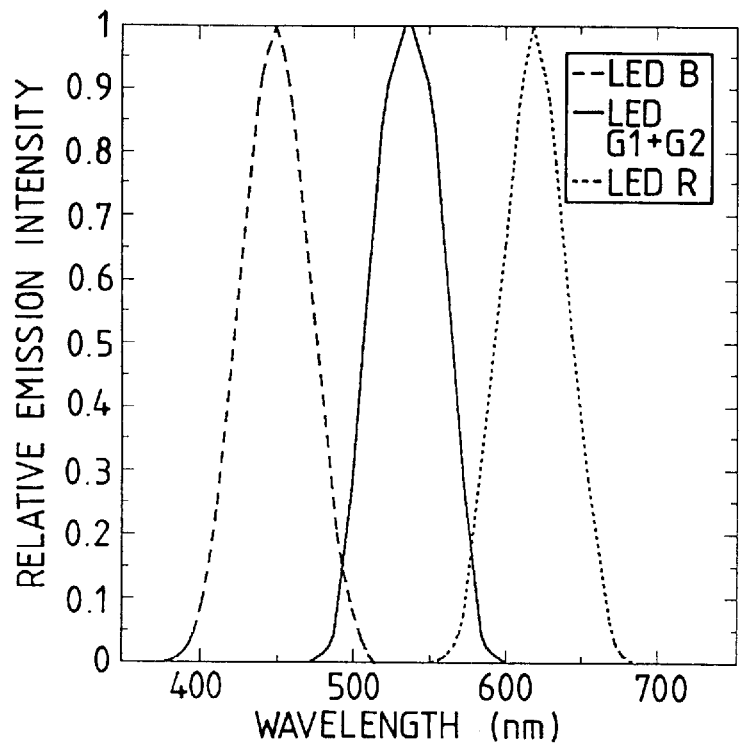
FIG. 18 is a diagram showing spectral emission characteristics of RGB light sources of the first embodiment.

The spectral characteristics when the G1 and G2 LEDs are turned on at the same time are shown in FIG. 18. In this case, since the visible light range does not contain an area with an excessively low light amount, an image sensor having color discrimination better than a conventional image sensor can be obtained.

As above, by turning on a plurality of LEDs having the spectral characteristics with a small full width at half-maximum, a light source switching image sensor can be realized which has an excellent color characteristic without a wavelength range having too small a light emission amount. If LEDs having the spectral characteristics with a small full width at half-maximum are used, only a small area of the line sensor contributes to a spectral sensitivity and a small sensor output signal is obtained. However, in this embodiment, since the area contributing to the spectral sensitivity of the line sensor becomes broad, a large output signal can be obtained easily.

In this embodiment, although a plurality type of G light sources are used, it is obvious that a plurality type of R or B light sources may also be used. The image sensor is not limited only to a multi-chip, tight contact type image sensor used in this and other following embodiments.

Figure 19:
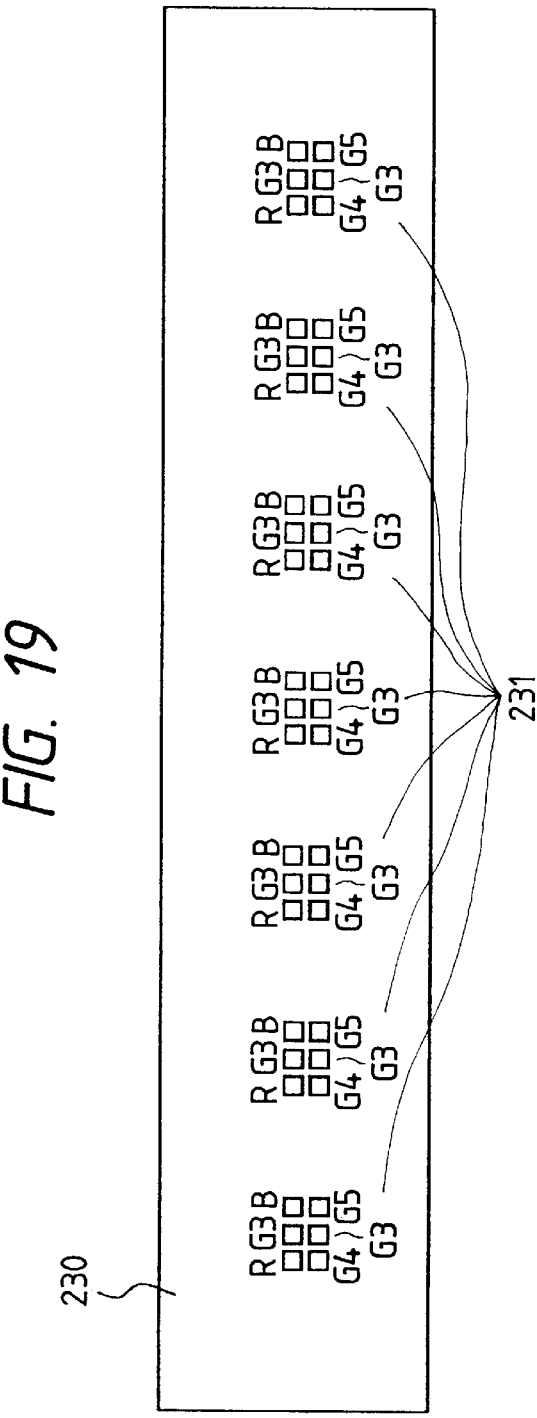
FIG. 19 shows the structure of an LED substrate of a second embodiment.

FIG. 19 shows an LED substrate 230 for a light source unit used by a light source switching, tight contact type multi-chip color image sensor, according to the second embodiment of the invention. The structure of the image forming apparatus is the same as that shown in FIG. 11, and is not shown. Referring to FIG. 19, a set of LED chips 231R, 231G3, 231G4, 231G5, and 231B having five different spectral characteristics constitutes an emission means. A plurality set of LED chips are disposed in line on the LED substrate 220, to thereby constitute an LED array 231.

In FIG. 19, three types of LED chips G3, G4, and G5 are prepared to emit G color light. The fundamentals of this image forming apparatus are the same as the conventional image forming apparatus, except that the number of LED chips G3 is twice that of G4 and G5. The spectral characteristics of LED chips 231R and 231B are the same as those of conventional LED chips 211R and 211B.

Figure 20:
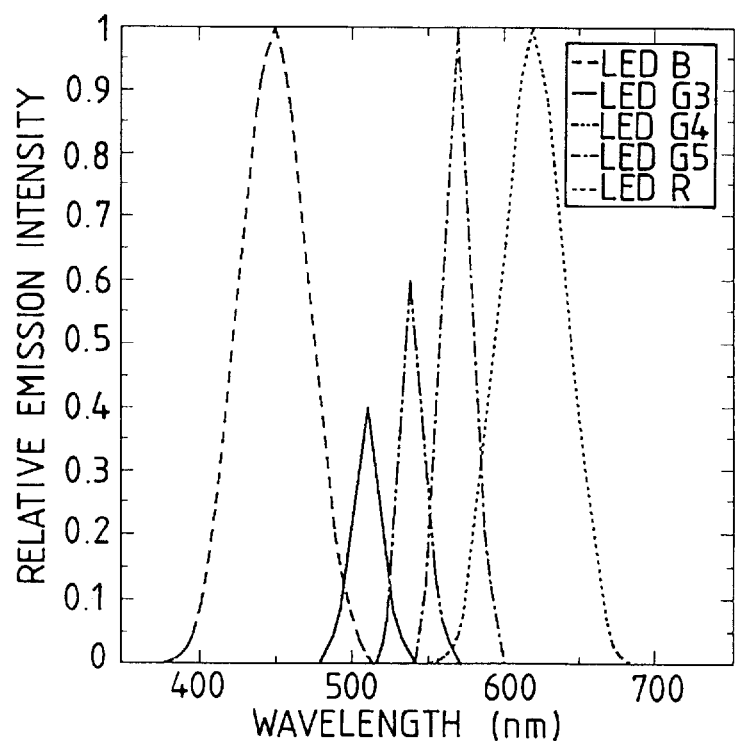
FIG. 20 is a diagram showing the spectral emission characteristic of LEDs of the second embodiment.

The spectral characteristics of the LED chips 231G3, 231G4, and 231G5 are shown in FIG. 20. The peak levels of G3 and G4, or G4 and G8 are slightly shifted, and the difference between peaks is 30 nm or less. In this embodiment, the LED substrate 230 is assembled on the image sensor shown in FIG. 12, instead of the LED substrate 220.

A read operation of an original with the light source switching color image sensor is similar to the first embodiment. Light beams from the RGB light sources are sequentially applied to the same point on an original to obtain RGB signals from the image sensor. For R or B light, the LED chip 231R or 231B is turned on like the first embodiment.

Figure 21:
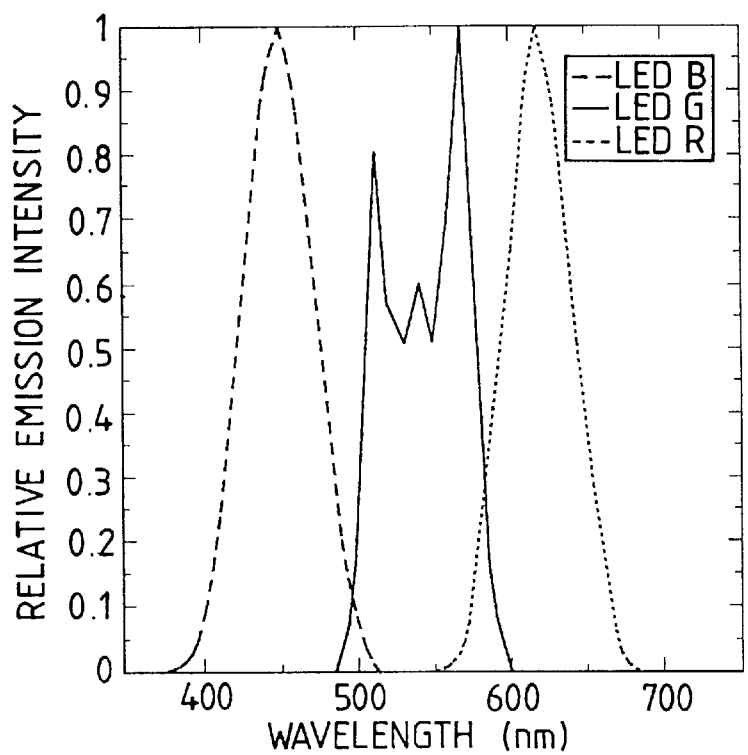
FIG. 21 is a diagram showing spectral emission characteristics of RGB light sources of the second embodiment.

For G light, the LED chips 231G3, 231G4, and 231G5 are turned on at the same time. For balanced and ideal spectral characteristics of mixed light beams, the number of LED chips 231G3 is set twice that of other LED chips. The total spectral characteristics of mixed G light beams from the LED chips 231G4 and 231G5 and the two LED chips 231G3 are shown in FIG. 21.

The color space of this color image sensor is calculated in the procedure similar to the first embodiment. First, the G tristimulus values Xg, Yg, and Zg are calculated:

$Xg=K\,(G3(\lambda)*2+G4(\lambda)+G5(\lambda))S(\lambda)x(\lambda)d\lambda$ $Yg=K\,(G3(\lambda)*2+G4(\lambda)+G5(\lambda))S(\lambda)y(\lambda)d\lambda$ $Zg=K\,(G3(\lambda)*2+G4(\lambda)+G5(\lambda))S(\lambda)z(\lambda)d\lambda$ $K=100/D65(\lambda)y(\lambda)d\lambda$ where $G3(\lambda)$: a spectral emission characteristic of LED chip G3, $G4(\lambda)$: a spectral emission characteristic of LED chip G4, and $G5(\lambda)$: a spectral emission characteristic of LED chip G5.

The R tristimulus values Xr, Yr, Zr, and B tristimulus values Xb, Yb, and Zb, and also the CIE-xy coordinates can be calculated in the similar manner.

Figure 22:
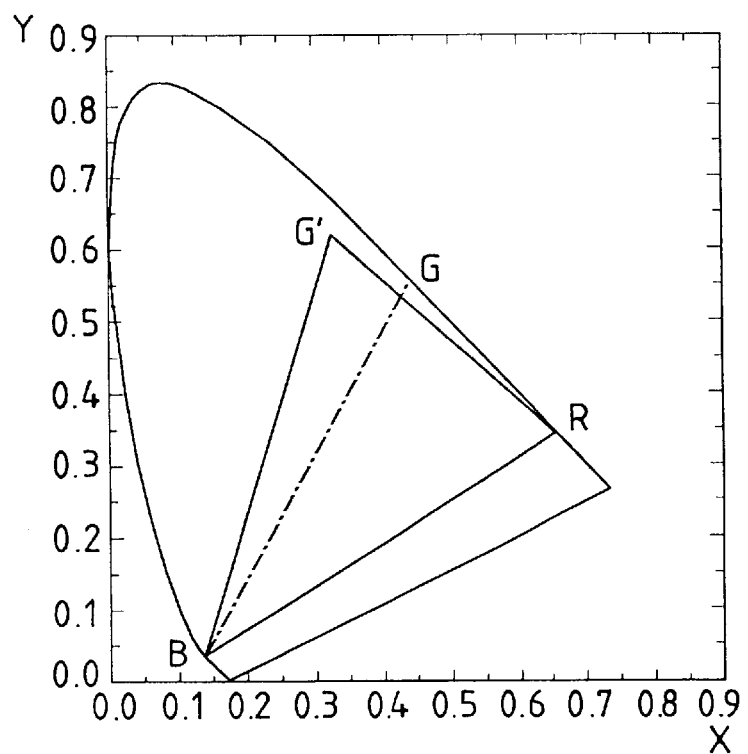
FIG. 22 is a diagram showing a color space of the multi-chip color image sensor of the second embodiment.

In accordance with the calculated RGB chromatic coordinates, a color space of the image sensor of this embodiment is obtained which is indicated by a solid line triangle in FIG. 22. A triangle indicated by one-dot chain line corresponds to the conventional color space shown in FIG. 8.

As seen from FIG. 22, the color space of the embodiment image sensor has a more balanced and broader shape than the conventional image sensor. An image sensor having an excellent color characteristic can thus be obtained.

In a practical color image forming apparatus, it is desired that the image sensor output signals obtained when light beams from the RGB light sources are sequentially applied to the white reference plate, have similar levels of RGB because of the convenience of a signal processing unit. Therefore, the number of LEDs having relatively small emission amount is required to be increased. With this embodiment, however, if the types and numbers of LED chips are determined while considering the total spectral characteristics when a plurality of LED chips are turned on at the same time, the output level can be adjusted while improving the color reproduction of the color image sensor.

Figure 23:
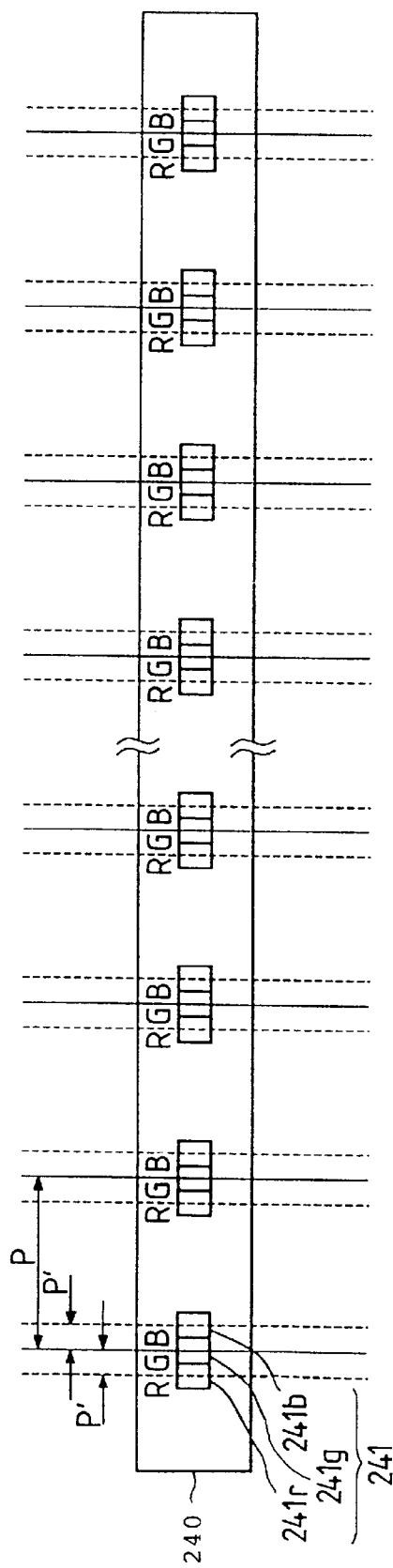
FIG. 23 shows the structure of a light source unit of a third embodiment.

FIG. 23 is a diagram showing the structure of a light source unit according to the third embodiment of the invention. This light source unit can be used with a tight contact type image sensor of the image forming apparatus shown in FIG. 2. Reference numeral 240 represents a substrate for the light source unit, on which LED chips 241 as light emitting elements are disposed. Suffixes r, g, and b of reference numeral 241 indicate red, green, and blue color of light, respectively. Each LED cell group constituted by three LED cells of RGB colors is used as a light emission means, each cell group being disposed at an equal interval P in the main scan direction of the sensor as a photoelectric conversion means, and being disposed facing the sensor at the same coordinates in the subscan direction.

In each LED cell group, three LED cells of RGB colors are disposed at an interval of p'<1/3×P. It is preferable to set the emission centers of LED cells of each group as near as possible in the main scan direction so long as the chip package allows such a position alignment. Any interval is allowed so long as the lateral length of the LED cell group is shorter than the distance between LED cell groups.

Figure 24:
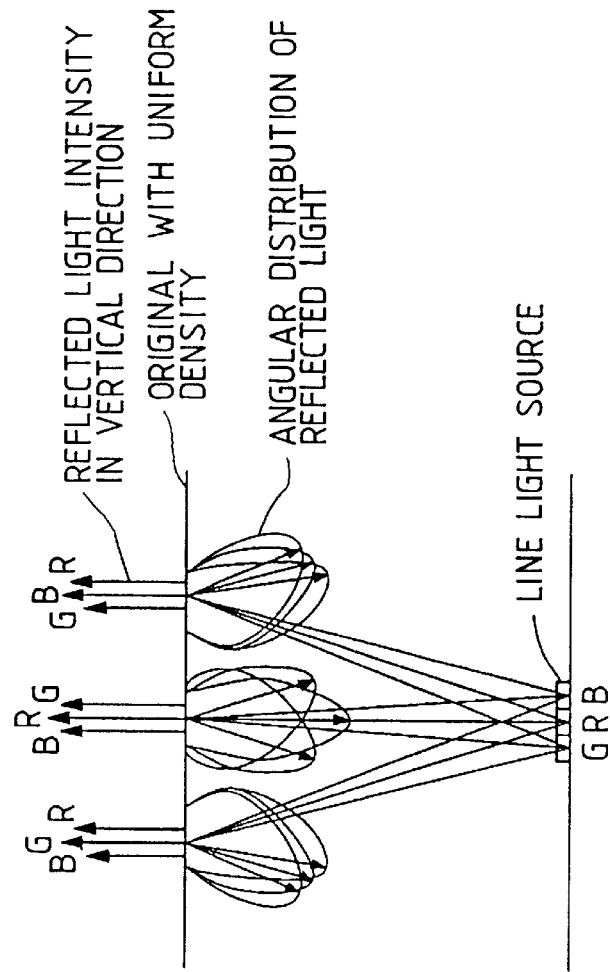
FIG. 24 is a diagram illustrating an angle distribution of reflected light intensity when an original is read by using the light source unit of the third embodiment.

In this embodiment, as shown in FIG. 24, the emission centers of the LED cells of each LED cell group are generally at the same position. Therefore, the incident angle of a light beam from each LED cell is generally the same for each color at an arbitrary point on an original, and the color components ratio, in the vertical direction, of light reflected from the original does not change with the position on the original.

Figure 25:
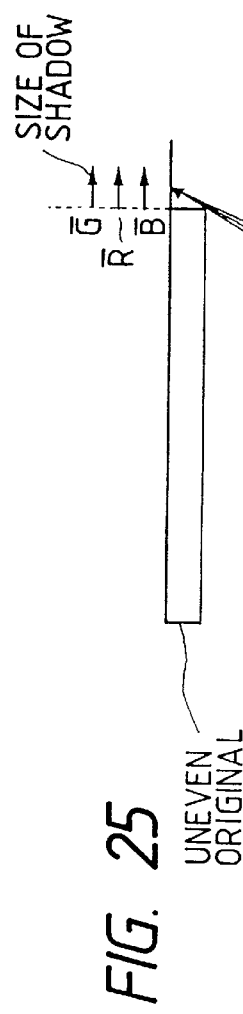
FIG. 25 is a diagram illustrating how an uneven original is read by using the light source unit of the third embodiment.

Furthermore, as shown in FIG. 25, even if an uneven original is read, the size of shadow generated at the corner of the convex area is generally the same for each color, so that the color of shadow disappears and the image quality can be improved. Still further, even if the number of LED chips is reduced, the image quality will not be degraded and a tight contact type color image sensor of low cost and high image quality can be realized.

In the embodiment, RGB three primary colors are used as light sources. Light sources are not limited to these colors. For example, magenta, cyan, and yellow may also be used. An original to be read is not limited to a reflection type, but a transmission type may also be used.

Figure 26:
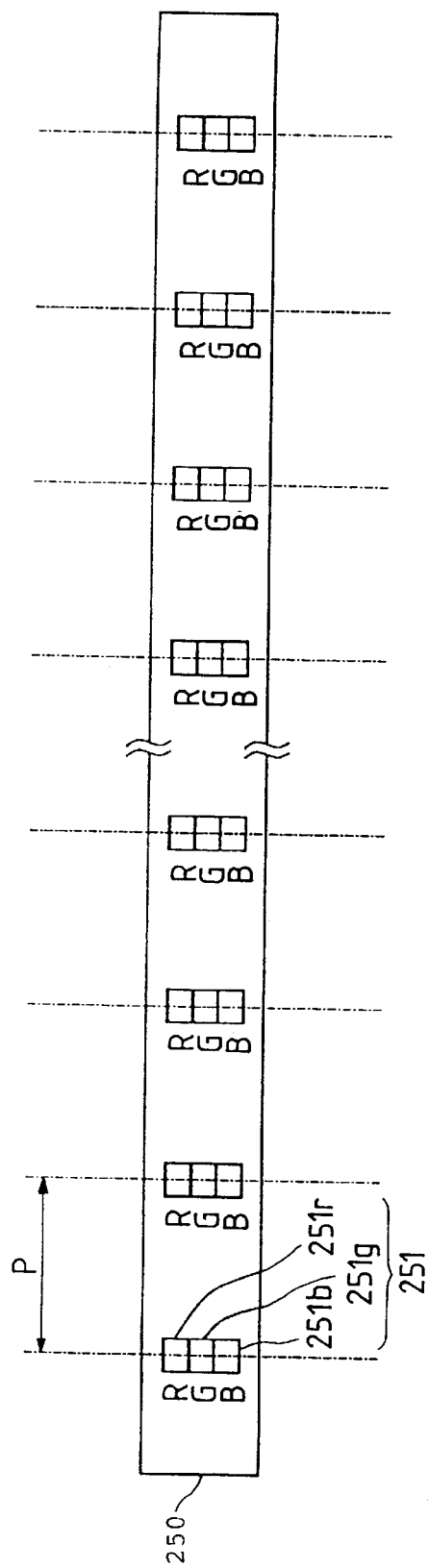
FIG. 26 shows the structure of a light source unit of a fourth embodiment.

FIG. 26 shows the structure of a light source unit according to the fourth embodiment of the invention. Each LED cell group as a light emission means is constituted by three LED cells or light emission elements of RGB colors. Each cell group is disposed at an equal interval P in the main scan direction of the sensor, and has three LED cells in the sub-scan direction. The emission centers of LED cells of each group are set as near as possible so long as the chip package allows such a position alignment. With this alignment, the similar effects to the third embodiment can be obtained.

Figure 27:
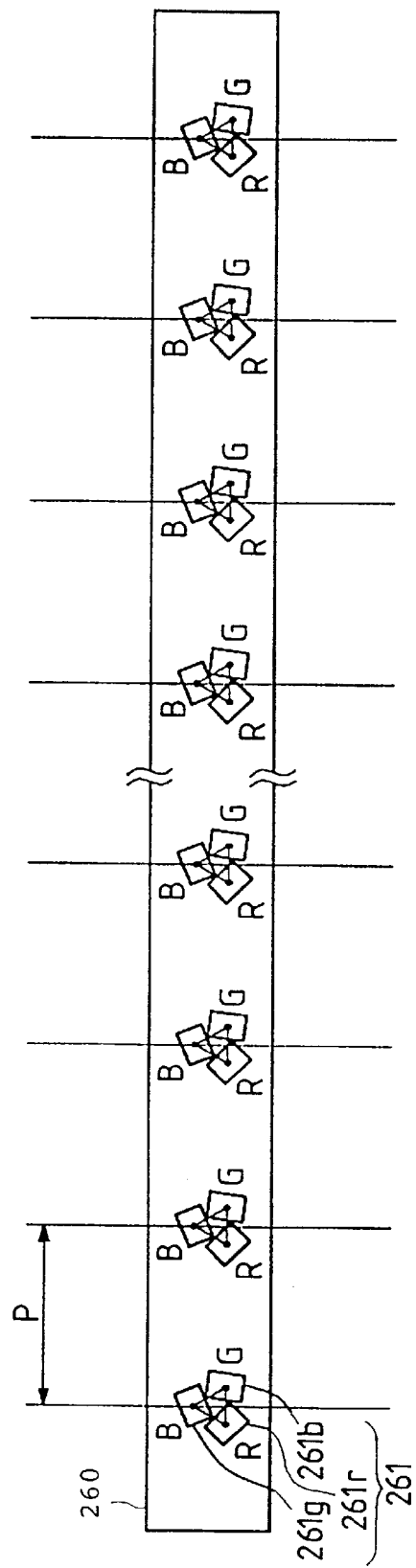
FIG. 27 shows the structure of a light source unit of a fifth embodiment.

FIG. 27 shows the structure of a light source unit according to the fifth embodiment of the invention. Each LED cell group as a light emission means is constituted by three LED cells or light emission elements of RGB colors. Each cell group is disposed at an equal interval P in the main scan direction of the sensor. In this embodiment, the emission centers of three LED cells of each cell group are disposed as near as possible so long as the chip package allows such a position alignment. An equilateral triangle whose apexes are the emission centers is formed. With this alignment, the similar effects to the third and fourth embodiments can be obtained.

Figure 28:
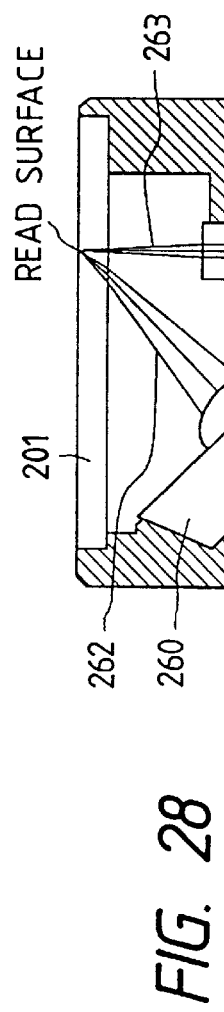
FIG. 28 is a cross sectional view of a multi-chip color image sensor according to a sixth embodiment of the invention.

FIG. 28 is a cross sectional diagram showing the structure of a light source switching, tight contact type color image sensor according to the sixth embodiment of the invention. In FIG. 28, reference numeral 250 represents a frame, reference numeral 260 represents a light source for emitting light from the side wall of a transparent member, reference numeral 262 represents light emitted from the light source 260, and reference numeral 263 represents light reflected from the surface of an original. The structure of the image forming apparatus of this embodiment is similar to that shown in FIG. 11, and the description thereof is omitted.

Figure 29:
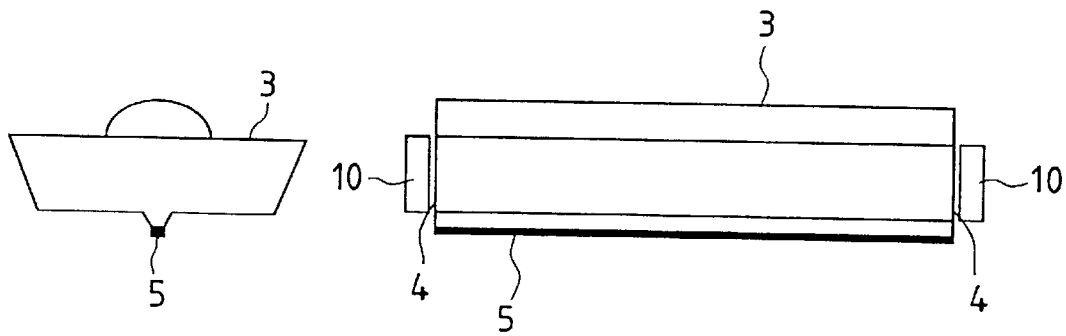
FIG. 29 shows the structure of a light source unit of the sixth embodiment.

The cross sectional view and side view of the light source 260 are detailed in FIG. 29. In FIG. 29, reference numeral 3 represents a transparent member, reference numeral 4 represents a plane through which light is incident upon the transparent member, reference numeral 5 represents a partial area of the transparent member on which a light diffusion and reflection paint is coated, and light reflected from this partial area is applied to an original, and reference numeral 10 represents an LED substrate 10 or light source unit from which light is incident to the incident plane 4.

Figure 30:
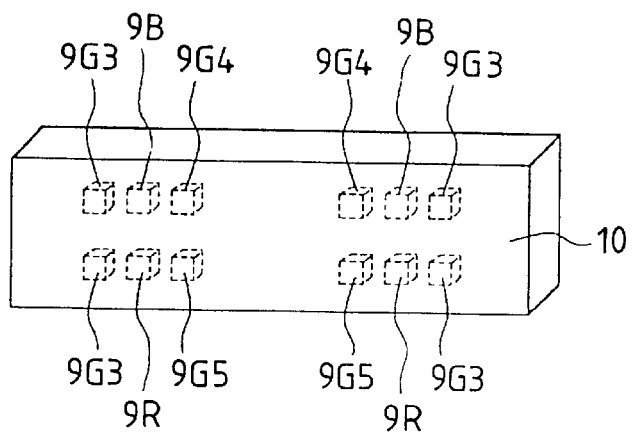
FIG. 30 shows the LED chip arrangement on the LED substrate of the sixth embodiment.
Figure 31:
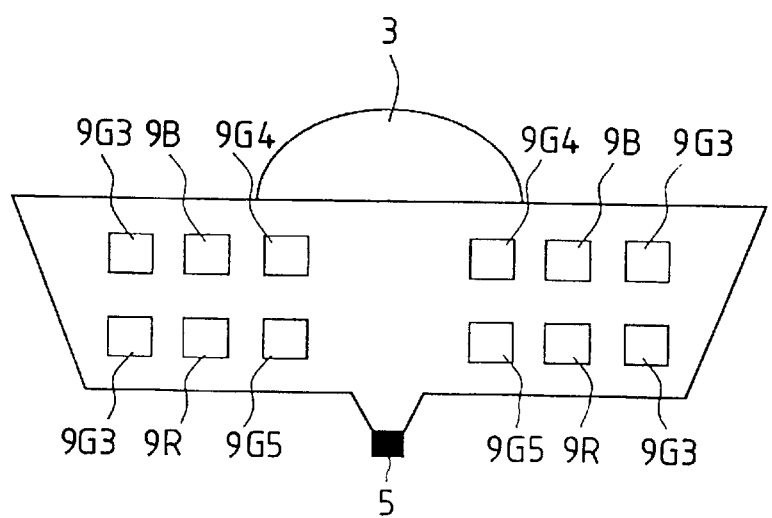
FIG. 31 shows the internal LED chip arrangement in a light source unit of the embodiment.

As shown in FIG. 30, a light emission means including a set of LED chips as light emitting elements 9R, 9G3, 9G4, 9G5, and 9B is mounted on the LED substrate 10. The positional relationship between the transparent member 3 and the LED chips 9R, 9G3, 9G4, 9G5, and 9B is shown in FIG. 31, the LED substrates 10 being mounted on the incident planes 4 of the transparent member 3. The spectral characteristics of the LEDs 9G3, 9G4, and 9G5 are the same as those shown in FIG. 20 of the second embodiment, and they are not shown in duplicate.

Light fluxes emitted from the LEDs 9R, 9G3, 9G4, 9G5 and 9B propagate while being repetitively reflected in the transparent member 3. The light fluxes incident to the area 5 during propagation is diffused and reflected at the area 5, and applied via a light emitting plane to the surface of an original. Of the light fluxes emitted from the LEDs 9R, 9G3, 9G4, 9G5 and 9B, the amount of light directly incident to the area 5 is sufficiently small, and the light fluxes incident to the area 5 is indirect light reflected at the inside of the transparent member. Therefore, a uniform luminance is obtained on the original in the longitudinal direction of the transparent member 3.

Figure 32:
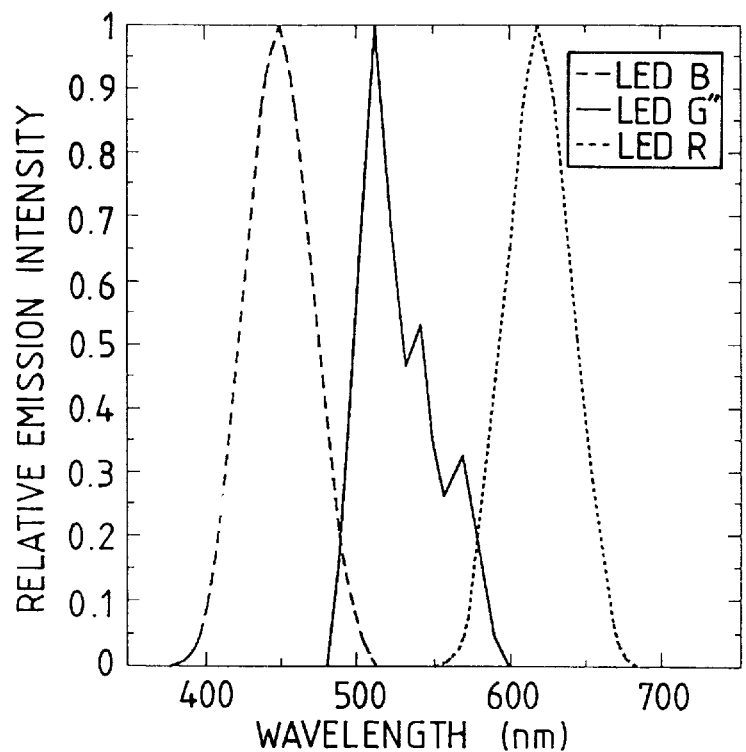
FIG. 32 is a diagram showing the spectral reflection characteristics of RGB light sources of the sixth embodiment.

In this embodiment, light is incident from the opposite ends of the transparent member and is emitted out of the side plane thereof. In this case, original illuminating light changes with the position of each light source. Similar to the second embodiment, the LEDs 9G3, 9G4, and 9G5 are turned on at the same time as the R light source also in this embodiment. The spectral characteristics of the LEDs 9G3, 9G4, and 9G5 are weighted respectively and the total spectral characteristic of the G light source becomes as shown in FIG. 32. As compared to FIG. 21 of the second embodiment, the total distribution is shifted to the short wavelength side.

A color space of the color image sensor of this embodiment is calculated in the similar procedure to the second embodiment. First, the tristimulus values Xg, Yg, and Zg of G color are calculated by the following equations while considering weighting of the LEDs 9G3, 9G4, and 9G5.

$$Xg = K(G3(\lambda)*2 + G4(\lambda)*0.7 + G5(\lambda)*0.25)S(\lambda)x(\lambda)d\lambda$$

$$Yg = K(G3(\lambda)*2 + G4(\lambda)*0.7 + G5(\lambda)*0.25)S(\lambda)y(\lambda)d\lambda$$

$$Zg = K(G3(\lambda)*2 + G4(\lambda)*0.7 + G5(\lambda)*0.25)S(\lambda)z(\lambda)d\lambda$$

$$K = 100/D65(\lambda)y(\lambda)d\lambda$$

where $G3(\lambda)$: a spectral emission characteristic of LED chip G3, $G4(\lambda)$: a spectral emission characteristic of LED chip G4, and $G5(\lambda)$: a spectral emission characteristic of LED chip G5.

The R tristimulus values Xr, Yr, and Zr and B tristimulus values Xb, Yb, and Zb, and their CIE-xy coordinates can be calculated in the similar manner. The color space of the embodiment image sensor obtained from the calculated RGB chromatic coordinates is shown in FIG. 33 and indicated by a solid line triangle.

Figure 8:
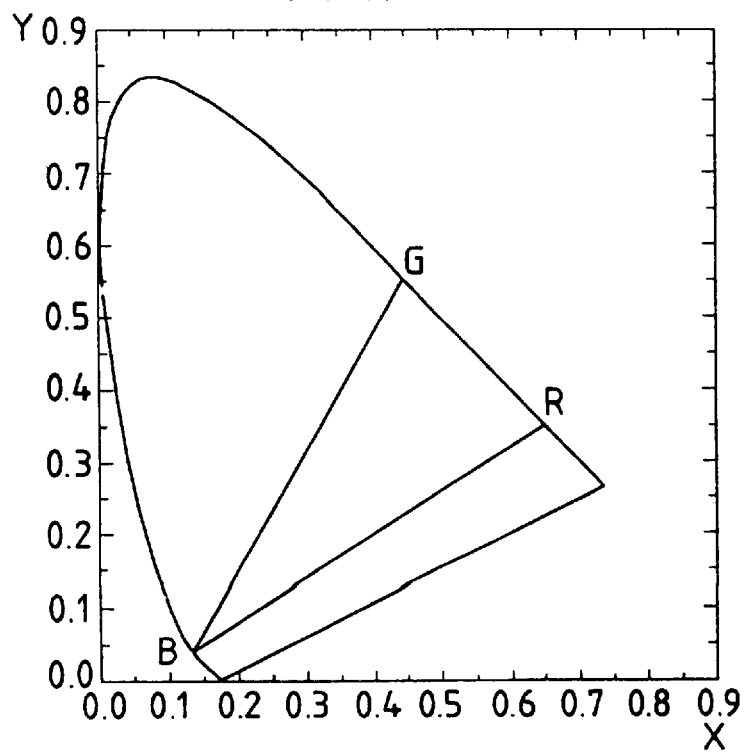
FIG. 8 is a diagram showing a color space of a conventional multi-chip color image sensor.
Figure 9:
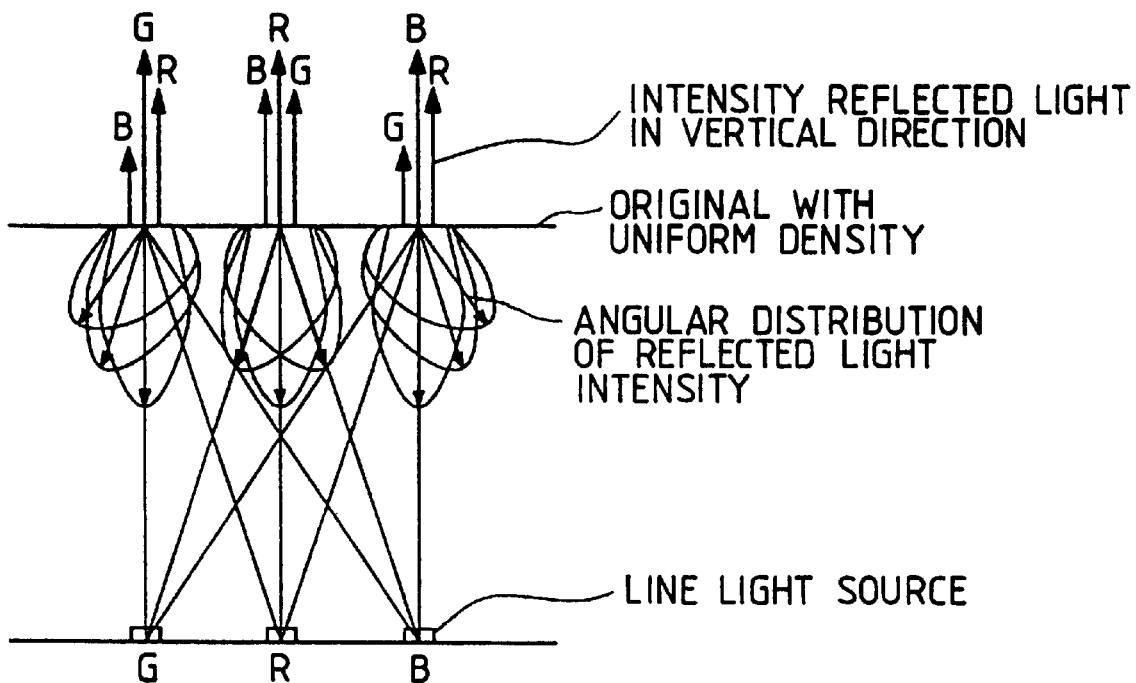
FIG. 9 is a diagram illustrating an angle distribution of reflected light intensity when an original is read by using a conventional light source unit.
Figure 10:
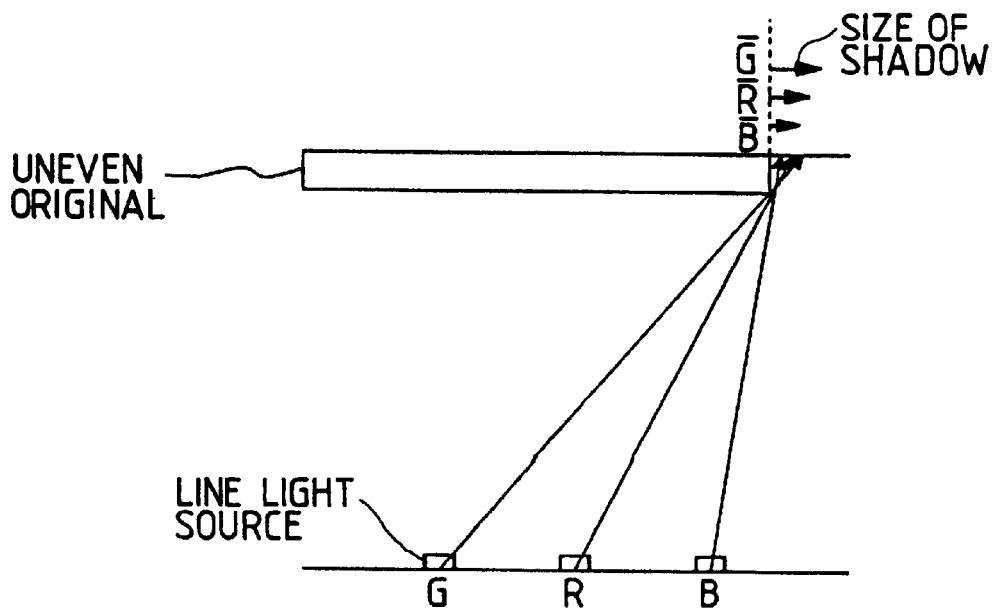
FIG. 10 is a diagram illustrating how an uneven original is read by using a conventional light source unit.
Figure 33:
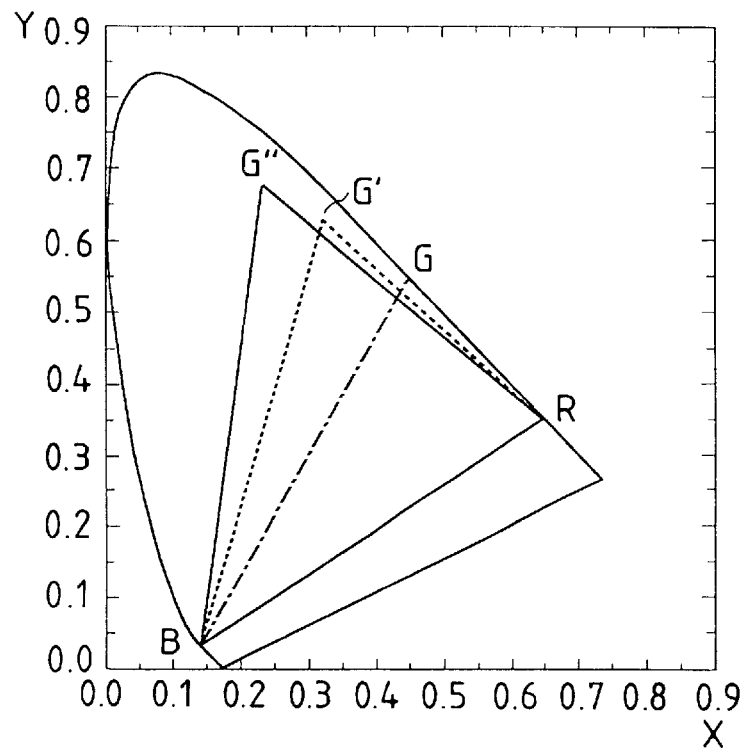
FIG. 33 is a diagram showing a color space of the multi-chip color image sensor of the sixth embodiment.

In FIG. 33, a one-dot chain line triangle indicates the color space of the conventional image sensor shown in FIG. 8, and a broken line triangle indicates the color space of the image sensor of the second embodiment shown in FIG. 22. As seen from FIG. 33, the color space of the embodiment image sensor has a balanced shape and provides the image sensor with an excellent color characteristic, as compared to the conventional and second embodiment image sensors.

As above, by changing the types, numbers, and position alignments of a plurality of LEDs turned on at the same time for G signals, the mixture ratio of emission light beams of the plurality of LEDs having different spectral characteristics can be changed to obtain a G light source having a desired spectral characteristic. The light source of this embodiment can emit uniform light as described earlier and the color image forming apparatus can easily process image signals. Therefore, this embodiment is most suitable for manufacturing low cost color image sensors.

What is claimed is:

1. A light source unit usable with an image forming apparatus having photoelectric converting means for converting light from an object into an image signal, comprising:

(A) light emitting means mounted facing said photoelectric converting means and having a plurality of light emitting elements each having a different spectral characteristic; and (B) a light source having a plurality of light emitting means disposed on a substrate, wherein said light emitting means includes at least two light emitting elements each for forming irradiation light of the same color, and peak wavelengths of said at least two light emitting elements are different from each other by a predetermined wavelength.

2. A light source unit according to claim 1, wherein a predetermined number of light emitting elements having a peak wavelength difference of said predetermined wavelength are disposed on the substrate in accordance with the spectral characteristic of light emitted from said light source.

3. A light source unit according to claim 1, wherein a predetermined number of light emitting elements having a peak wavelength difference of said predetermined wavelength are disposed on the substrate at predetermined positions in accordance with the spectral characteristic of light emitted from said light source.

4. A light source unit according to claim 1, wherein the number of light emitting elements of said light emitting means is larger than at least the number of color signals to be finally obtained.

5. A light source unit according to claim 4, wherein a predetermined number of light emitting elements having a peak wavelength difference of said predetermined wavelength are disposed on the substrate in accordance with the spectral characteristic of light emitted from said light source.

6. A light source unit according to claim 4, wherein a predetermined number of light emitting elements having a peak wavelength difference of said predetermined wavelength are disposed on the substrate at predetermined positions in accordance with the spectral characteristic of light emitted from said light source.

7. A light source unit according to claim 1, further comprising control means for controlling to turn on light emitting elements in said light emitting means having a peak wavelength difference of said predetermined wavelength, at the same time.

8. A light source unit according to claim 7, wherein a predetermined number of light emitting elements having a peak wavelength difference of said predetermined wavelength are disposed on the substrate in accordance with the spectral characteristic of light emitted from said light source.

9. A light source unit according to claim 7, wherein a predetermined number of light emitting elements having a peak wavelength difference of said predetermined wavelength are disposed on the substrate at predetermined positions in accordance with the spectral characteristic of light emitted from said light source.

10. A light source unit according to claim 7, wherein the number of light emitting elements of said light emitting means is larger than at least the number of color signals to be finally obtained.

11. A light source unit according to claim 10, wherein a predetermined number of light emitting elements having a peak wavelength difference of said predetermined wavelength are disposed on the substrate in accordance with the spectral characteristic of light emitted from said light source.

12. A light source unit according to claim 10, wherein a predetermined number of light emitting elements having a peak wavelength difference of said predetermined wavelength are disposed on the substrate at predetermined positions in accordance with the spectral characteristic of light emitted from said light source.

13. An image forming apparatus comprising:
   (A) light emitting means having a plurality of light emitting elements each having a different spectral characteristic;
   (B) a light source having a plurality of light emitting means disposed on a substrate; and
   (C) photoelectric converting means for converting light from an object applied with light from said light source into an image signal,
      wherein said light emitting means includes at least two light emitting elements each for forming irradiation light of the same color, and peak wavelengths of said at least two light emitting elements are different from each other by a predetermined wavelength.

14. An apparatus according to claim 13, wherein a predetermined number of light emitting elements having a peak wavelength difference of said predetermined wavelength are disposed on the substrate in accordance with the spectral characteristic of light emitted from said light source.

15. An apparatus according to claim 13, wherein a predetermined number of light emitting elements having a peak wavelength difference of said predetermined wavelength are disposed on the substrate at predetermined positions in accordance with the spectral characteristic of light emitted from said light source.

16. An apparatus according to claim 13, wherein the number of light emitting elements of said light emitting means is larger than at least the number of color signals to be finally obtained.

17. An apparatus according to claim 16, wherein a predetermined number of light emitting elements having a peak wavelength difference of said predetermined wavelength are disposed on the substrate in accordance with the spectral characteristic of light emitted from said light source.

18. An apparatus according to claim 16, wherein a predetermined number of light emitting elements having a peak wavelength difference of said predetermined wavelength are disposed on the substrate at predetermined positions in accordance with the spectral characteristic of light emitted from said light source.

19. An apparatus according to claim 13, further comprising control means for controlling to turn on light emitting elements in said light emitting means having a peak wavelength difference of said predetermined wavelength at the same time.

20. An apparatus according to claim 19, wherein a predetermined number of light emitting elements having a peak wavelength difference of said predetermined wavelength are disposed on the substrate in accordance with the spectral characteristic of light emitted from said light source.

21. An apparatus according to claim 19, wherein a predetermined number of light emitting elements having a peak wavelength difference of said predetermined wavelength are disposed on the substrate at predetermined positions in accordance with the spectral characteristic of light emitted from said light source.

22. An apparatus according to claim 19, wherein the number of light emitting elements of said light emitting means is larger than at least the number of color signals to be finally obtained.

23. An apparatus according to claim 22, wherein a predetermined number of light emitting elements having a peak wavelength difference of said predetermined wavelength are disposed on the substrate in accordance with the spectral characteristic of light emitted from said light source.

24. An apparatus according to claim 22, wherein a predetermined number of light emitting elements having a peak wavelength difference of said predetermined wavelength are disposed on the substrate at predetermined positions in accordance with the spectral characteristic of light emitted from said light source.

25. An image reading apparatus, comprising:
   (A) a light source comprising a plurality of light emitting elements each having a different spectral characteristics;
   (B) light guiding means for guiding a light emitted from said light source to linearly illuminate an object; and
   (C) a line sensor for converting a light from said object illuminated by said light guiding means into an image signal,
      wherein said light source includes at least two light emitting elements each for forming irradiation light of the same color, and peak wavelengths of said at least two light emitting elements are different from each other by a predetermined wavelength.

26. An apparatus according to claim 25, wherein the light emitting element includes an LED.

27. An image reading system comprising:
   (A) a light source having a plurality of light emitting means arranged on a substrate, each of the plurality of light emitting means having a plurality of light emitting elements each having a different spectral characteristic,
      wherein said light emitting means includes at least two light emitting elements each for forming irradiation light of the same color, and peak wavelengths of said at least two light emitting elements are different from each other by a predetermined wavelength;
   (B) reading means for reading an image illuminated with light from said light source, by converting said image into an image signal;
   (C) signal processing means for performing a predetermined signal processing on the image signal output from said reading means; and
   (D) control means for controlling said reading means and said signal processing means.

28. A system according to claim 27, wherein a predetermined number of light emitting elements having a peak wavelength difference of said predetermined wavelength are disposed on the substrate in accordance with the spectral characteristic of light emitted from said light source.

29. A system according to claim 27, wherein a predetermined number of light emitting elements having a peak wavelength difference of said predetermined wavelength are disposed on the substrate at predetermined positions in accordance with the spectral characteristic of light emitted from said light source.

30. A system according to claim 27, wherein the number of light emitting elements of each of said light emitting means is larger than at least the number of color signals to be finally obtained.

31. A system according to claim 30, wherein a predetermined number of light emitting elements having a peak wavelength difference of said predetermined wavelength are disposed on the substrate in accordance with the spectral characteristic of light emitted from said light source.

32. A system according to claim 30, wherein a predetermined number of light emitting elements having a peak wavelength difference of said predetermined wavelength are disposed on the substrate at predetermined positions in accordance with the spectral characteristic of light emitted from said light source.

33. A system according to claim 27, further comprising control means for controlling so as to turn on light emitting elements in said light emitting means having a peak wavelength difference of said predetermined wavelength at the same time.

34. A system according to claim 33, wherein a predetermined number of light emitting elements having a peak wavelength difference of said predetermined wavelength are disposed on the substrate in accordance with the spectral characteristic of light emitted from said light source.

35. A system according to claim 33, wherein a predetermined number of light emitting elements having a peak wavelength difference of said predetermined wavelength are disposed on the substrate at predetermined positions in accordance with the spectral characteristic of light emitted from said light source.

36. A system according to claim 33, wherein the number of light emitting elements of each of said light emitting means is larger than at least the number of color signals to be finally obtained.

37. A system according to claim 36, wherein a predetermined number of light emitting elements having a peak wavelength difference of said predetermined wavelength are disposed on the substrate in accordance spectral characteristic of light emitted from said light source.

38. A system according to claim 36, wherein a predetermined number of light emitting elements having a peak wavelength difference of said predetermined wavelength are disposed on the substrate at predetermined positions in accordance with the spectral characteristic of light emitted from said light source.

39. An image reading system comprising
(A) a light source comprising a plurality of light emitting elements each having a different spectral characteristic;
(B) light guiding means for guiding a light emitted from said light source to linearly illuminate an object;
(C) reading means for reading an image illuminated by said light guiding means, by converting light from said image into an image signal;
(D) signal processing means for performing a predetermined signal processing on the image signal output from said reading means; and
(E) control means for controlling said reading means and said signal processing means,
wherein said light source includes at least two light emitting elements each for forming irradiation light of the same color, and peak wavelengths of said at least two light emitting elements are different from each other by a predetermined wavelength.

40. A system according to claim 39, wherein the light emitting elements include an LED.

41. An image forming apparatus comprising:
(A) light emitting means having a plurality of light emitting elements each having a different spectral characteristic;
(B) a light source having a plurality of said light emitting means disposed on a substrate; and
(C) photoelectric converting means mounted facing said plurality of light emitting means for converting light from an object applied with light from said light source into an image signal,
wherein said plurality of light emitting elements each having the different spectral characteristic are arranged close to each other in a main scanning direction of said photoelectric converting means so that said plurality of light emitting elements are arranged at an interval shorter than the interval at which said plurality of light emitting means are arranged.

42. An apparatus according to claim 41, wherein said light emitting means includes three light emitting elements.

43. An apparatus according to claim 42, wherein said three light emitting elements are disposed so that the emission centers of said three light emitting elements are positioned on the apexes of a triangle.

44. A light source unit usable with an image forming apparatus having photoelectric converting means for converting light from an object into an image signal, comprising:
(A) light emitting means mounted facing said photoelectric converting means and having a plurality of light emitting elements each having a different spectral characteristic; and
(B) a light source having a plurality of said light emitting means disposed on a substrate,
wherein said plurality of light emitting elements each having the different spectral characteristic are arranged close to each other in a main scanning direction so that said plurality of light emitting elements are arranged at an interval shorter than the interval at which said plurality of light emitting means are arranged.

45. A light source unit according to claim 44, wherein the plurality of light emitting elements of said light emitting means are disposed in a main scan direction of said photoelectric converting means.

46. A light source unit according to claim 44, wherein said light emitting means includes three light emitting elements.

47. A light source unit according to claim 46, wherein said three light emitting elements are disposed so that the emission centers of said three light emitting elements are positioned on the apexes of a triangle.

48. An image reading system comprising:
(A) a light source having a plurality of light emitting means disposed on a substrate, each of said plurality of light emitting means having a plurality of light emitting elements each having a different spectral characteristic;
(B) reading means for reading an image illuminated with light from said light source, by converting light from said image into an image signal;
(C) signal processing means for performing a predetermined signal processing on the image signal output from said reading means; and
(D) control means for controlling said reading means and said signal processing means,
wherein said plurality of light emitting elements each having the different spectral characteristic are arranged close to each other in a main scanning direction of said reading means so that said plurality of light emitting elements are arranged at an interval shorter than the interval at which said plurality of light emitting means are arranged.

49. A system according to claim 48, wherein each said light emitting means includes three light emitting elements.

50. A system according to claim 49, wherein said three light emitting elements are disposed so that the emission centers of said three light emitting elements are positioned on the apexes of a triangle.

51. An image forming apparatus comprising:
(A) light emitting means having a plurality of light emitting elements each having a different spectral characteristic:
(B) a light source having a plurality of light emitting means disposed on a substrate; and
(C) photoelectric converting means mounted facing said light emitting means for converting light from an object applied with light from said light source into an image signals,
wherein at least three light emitting elements each having a different spectral characteristic are arranged close to each other in a sub-scan direction of said photoelectric converting means at an interval shorter than the interval at which said plurality of light emitting means are arranged.

52. A light source unit usable with an image forming apparatus having photoelectric converting means for converting light from an object into an image signal, comprising:
(A) light emitting means facing said photoelectric converting means and having a plurality of light emitting elements each having a different spectral characteristic; and
(B) a light source having a plurality of light emitting means disposed on a substrate,
wherein at least three light emitting elements each having the different spectral characteristic are arranged close to each other in a sub-scan direction of said photoelectric converting means at an interval shorter than the interval at which said plurality of light emitting means are arranged.

53. An image reading system comprising:
(A) a light source having a plurality of at least three light emitting means disposed on a substrate, each of said plurality of light emitting means having a plurality of light emitting elements each having a different spectral characteristic;
(B) reading means for reading an image illuminated with light from said light source, by converting light from said image into an image signal;
(C) signal processing means for performing a predetermined signal processing on the image signal output from said reading means; and
(D) control means for controlling said reading means and said signal processing means,
wherein at least three of said light emitting elements each having the different spectral characteristic are arranged close to each other in a sub-scan direction of said reading means at an interval shorter than the interval at which said plurality of light emitting means are arranged.

54. An image forming apparatus comprising:
(A) light emitting means having a plurality of light emitting elements each having a different spectral characteristic;
(B) a light source having a plurality of light emitting means disposed on a substrate; and
(C) photoelectric converting means mounted facing said light emitting means for converting light from an object applied with light from said light source into an image signal,
wherein said plurality of light emitting elements each having the different spectral characteristic are arranged close to each other so that the emission centers of said plurality of light emitting elements are positioned respectively at vertices of a polygon.

55. An apparatus according to claim 54, wherein said plurality of light emitting elements include three light emitting elements and the polygon is a triangle.

56. A light source unit usable with an image forming apparatus having photoelectric converting means for converting light from an object into an image signal, comprising:
(A) light emitting means mounted facing the photoelectric converting means and having a plurality of light emitting elements each having a different spectral characteristic; and
(B) a light source having a plurality of light emitting means disposed on a substrate,
wherein said plurality of light emitting elements each having the different spectral characteristic are arranged close to each other so that the emission centers of said plurality of light emitting elements are positioned respectively at vertices of a polygon.

57. An apparatus according to claim 56, wherein said plurality of light emitting elements include three light emitting elements and the polygon is a triangle.

58. An image reading system comprising:
(A) light source having a plurality of light emitting means disposed on a substrate, the light emitting means having a plurality of light emitting elements each having a different spectral characteristic;
(B) reading means for reading an image illuminated with light from said light source, by converting light from the image into an image signal;
(C) signal processing means for performing a predetermined signal processing on the image signal output from said reading means; and
(D) control means for controlling said reading means and said signal processing means,
wherein said plurality of light emitting elements each having the different spectral characteristic are arranged close to each other so that the emission centers are positioned respectively at vertices of a polygon.

59. A system according to claim 58, wherein said plurality of light emitting elements include three light emitting elements and the polygon is a triangle.

* * * * *

UNITED STATES PATENT AND TRADEMARK OFFICE
CERTIFICATE OF CORRECTION

PATENT NO.   :   5,898,510

DATED        :   April 27, 1999

INVENTOR(S)  :   TAKAHIRO KAIHOTSU ET AL.

It is certified that error appears in the above-identified patent and that said Letters Patent is hereby corrected as shown below:

COLUMN 1

Line 11, "apparatus," should read --apparatuses,--.

COLUMN 2

Line 58, "$G_{out}=G7(\lambda)(or\ G8(\lambda))S(\lambda)d\lambda$" should read
--$G_{out}=\int G7(\lambda)(or\ G8(\lambda))S(\lambda)d\lambda$--.

COLUMN 7

Line 38, "$Xg=K(G1(\lambda)+G2(\lambda))S(\lambda)x(\lambda)d\lambda$ $Yg=K(G1(\lambda)+G2(\lambda))S(\lambda)y(\lambda)d\lambda$ $Zg=K(G1(\lambda)+G2(\lambda))S(\lambda)z(\lambda)d\lambda$ $K=100/D65(\lambda)y(\lambda)d\lambda$"

should read

--$Xg=K\int(G1(\lambda)+G2(\lambda))S(\lambda)x(\lambda)d\lambda$ $Yg=K\int(G1(\lambda)+G2(\lambda))S(\lambda)y(\lambda)d\lambda$ $Zg=K\int(G1(\lambda)+G2(\lambda))S(\lambda)z(\lambda)d\lambda$ $K=100/\int D65(\lambda)y(\lambda)d\lambda$--;

Line 53, "calorimetric" should read --colorimetric--;
Line 54, "are" should read --is--.

UNITED STATES PATENT AND TRADEMARK OFFICE
CERTIFICATE OF CORRECTION

PATENT NO.   : 5,898,510

DATED        : April 27, 1999

INVENTOR(S)  : TAKAHIRO KAIHOTSU ET AL.

It is certified that error appears in the above-identified patent and that said Letters Patent is hereby corrected as shown below:

<u>COLUMN 9</u>

Line 6,    "$Xg=K(G3(\lambda)*2+G4(\lambda)+G5(\lambda))S(\lambda)x(\lambda)d\lambda$ $Yg=K(G3(\lambda)*2+G4(\lambda)+G5(\lambda))S(\lambda)y(\lambda)d\lambda$ $Zg=K(G3(\lambda)*2+G4(\lambda)+G5(\lambda))S(\lambda)z(\lambda)d\lambda$ $K=100/D65(\lambda)y(\lambda)d\lambda$"

should read

--$Xg=K\int(G3(\lambda)*2+G4(\lambda)+G5(\lambda))S(\lambda)x(\lambda)d\lambda$ $Yg=K\int(G3(\lambda)*2+G4(\lambda)+G5(\lambda))S(\lambda)y(\lambda)d\lambda$ $Zg=K\int(G3(\lambda)*2+G4(\lambda)+G5(\lambda))S(\lambda)z(\lambda)d\lambda$ $K=100/\int D65(\lambda)y(\lambda)d\lambda$--.

<u>COLUMN 11</u>

Line 35,   "$Xg=K(G3(\lambda)*2+G4(\lambda)*0.7+G5(\lambda)*0.25)S(\lambda)x(\lambda)d\lambda$ $Yg=K(G3(\lambda)*2+G4(\lambda)*0.7+G5(\lambda)*0.25)S(\lambda)y(\lambda)d\lambda$ $Zg=K(G3(\lambda)*2+G4(\lambda)*0.7+G5(\lambda)*0.25)S(\lambda)z(\lambda)d\lambda$ $K=100/D65(\lambda)y(\lambda)d\lambda$"

should read

--$Xg=K\int(G3(\lambda)*2+G4(\lambda)*0.7+G5(\lambda)*0.25)S(\lambda)x(\lambda)d\lambda$ $Yg=K\int(G3(\lambda)*2+G4(\lambda)*0.7+G5(\lambda)*0.25)S(\lambda)y(\lambda)d\lambda$ $Zg=K\int(G3(\lambda)*2+G4(\lambda)*0.7+G5(\lambda)*0.25)S(\lambda)z(\lambda)d\lambda$ $K=100/\int D65(\lambda)y(\lambda)d\lambda$--.

UNITED STATES PATENT AND TRADEMARK OFFICE
CERTIFICATE OF CORRECTION

PATENT NO. : 5,898,510

DATED : April 27, 1999

INVENTOR(S) : TAKAHIRO KAIHOTSU ET AL.

It is certified that error appears in the above-identified patent and that said Letters Patent is hereby corrected as shown below:

<u>COLUMN 14</u>

Line 16, "tics;" should read --tic;--.

<u>COLUMN 15</u>

Line 29, "spectral" should read --with the spectral--;
   Line 37, "comprising" should read --comprising:--.

<u>COLUMN 17</u>

Line 4, "acteristic:" should read --acteristic;--;
   Line 10, "signals," should read --signal--.

NY_MAIN 33451 v 1

Signed and Sealed this

Eleventh Day of April, 2000

Attest:

Q. TODD DICKINSON

Attesting Officer     Director of Patents and Trademarks